(12) United States Patent
Janik et al.

(10) Patent No.: US 6,256,193 B1
(45) Date of Patent: Jul. 3, 2001

(54) VERTICAL DOCKING AND POSITIONING APPARATUS FOR A PORTABLE COMPUTER

(75) Inventors: Craig M. Janik, Los Altos Hills; Tony Lillios, Palo Alto; Garth Morgan, Portola Valley; Matthew Rohrbach, San Francisco, all of CA (US)

(73) Assignee: Speck Product Design, Inc., Palo Alto, CA (US)

( * ) Notice: Subject to any disclaimer, the term of this patent is extended or adjusted under 35 U.S.C. 154(b) by 0 days.

(21) Appl. No.: 09/400,795

(22) Filed: Sep. 21, 1999

Related U.S. Application Data

(60) Provisional application No. 60/101,424, filed on Sep. 22, 1998.

(51) Int. Cl.[7] ................. H05K 5/00; H05K 7/20
(52) U.S. Cl. ............ 361/683; 361/690; 361/680; 361/686; 364/708.1; 248/922
(58) Field of Search .................. 361/683, 680, 361/681, 682, 686, 727, 687, 688–695; 364/708.1; 248/917–924, 136, 175, 153, 166, 456, 454, 440.1, 460, 461, 465.1

(56) References Cited

U.S. PATENT DOCUMENTS

| | | |
|---|---|---|
| 1,096,327 | 5/1914 | Thorniley . |
| 1,409,525 | 3/1922 | Cox . |
| 3,920,276 | 11/1975 | Sparrow . |
| 4,085,961 | 4/1978 | Brown . |
| 4,307,672 | 12/1981 | Shikimi . |
| 4,437,638 | 3/1984 | Scheibenpflug . |
| 4,500,134 | 2/1985 | Kaneko et al. . |
| 4,515,086 | 5/1985 | Kwiecinski et al. . |
| 4,562,987 | 1/1986 | Leeds et al. . |
| 4,567,835 | 2/1986 | Reese et al. . |
| 4,571,456 | 2/1986 | Paulsen et al. . |
| 4,600,255 * | 7/1986 | Dubarko ........................ 32/333 |
| 4,624,510 | 11/1986 | Jedziniak . |
| 4,706,575 | 11/1987 | Hamlin . |
| 4,708,312 | 11/1987 | Rohr . |
| 4,742,478 | 5/1988 | Nigro, Jr. et al. . |
| 4,854,538 * | 8/1989 | Von Schalsca ........................ 248/346 |
| 4,863,124 | 9/1989 | Ball et al. . |
| 4,863,140 | 9/1989 | Schriner . |
| 4,974,808 | 12/1990 | Ball . |
| 5,122,941 | 6/1992 | Gross et al.. . |
| 5,141,196 * | 8/1992 | Arnold et al. ........................ 248/397 |
| 5,161,766 * | 11/1992 | Arima ........................ 248/447 |
| 5,177,665 * | 1/1993 | Franks et al. ........................ 361/380 |
| 5,260,884 | 11/1993 | Stern . |
| 5,323,291 | 6/1994 | Boyle et al. . |
| 5,377,598 | 1/1995 | Kirchner et al. . |

(List continued on next page.)

Primary Examiner—Leo P. Picard
Assistant Examiner—Anatoly Vortman
(74) Attorney, Agent, or Firm—Gray Cary Ware & Freidenrich LLP

(57) ABSTRACT

A positioning device for supporting a portable computer that includes a base member for placing on a horizontal surface, a support plate for supporting the portable computer at an inclined position relative to the base member, a hinge that rotatably connects the base member to the support plate so that the support plate can be rotated between multiple angular positions relative to the base member, and a lock mechanism for selectively fixing the angular position between the base member and the support plate. The portable computer, which includes a base housing having a front and rear end, a flat panel display rotatably attached to the rear end of the base housing, and a keyboard attached to a top surface of the base housing, can be supported in an inclined position directly by a support member that is rotatably attached to the front end of the base housing so that the support member can be rotated between multiple angular positions relative to the base housing, where a lock mechanism selectively fixes the angular position between the support member and the base housing so that the support member supports the base housing at an inclined position.

12 Claims, 32 Drawing Sheets

U.S. PATENT DOCUMENTS

| | | |
|---|---|---|
| 5,436,792 | 7/1995 | Leman et al. . |
| 5,452,531 | 9/1995 | Graville et al. . |
| 5,552,957 * | 9/1996 | Brown et al. ............... 361/683 |
| 5,552,960 | 9/1996 | Nelson et al. . |
| 5,555,491 * | 9/1996 | Tao ............................. 361/686 |
| 5,592,362 * | 1/1997 | Ohgami et al. ............. 361/686 |
| 5,633,782 | 5/1997 | Goodman et al. . |
| 5,704,212 * | 1/1998 | Erler et al. ..................... 62/3.2 |
| 5,751,548 * | 5/1998 | Hall et al. ................... 361/686 |
| 5,768,101 | 6/1998 | Cheng . |
| 5,771,814 | 6/1998 | Clausen . |
| 5,818,360 | 10/1998 | Chu et al. . |
| 5,832,840 | 11/1998 | Woof . |
| 5,859,762 | 1/1999 | Clark et al. . |
| 5,899,421 * | 5/1999 | Silverman ..................... 248/175 |
| 5,915,661 * | 6/1999 | Silverman et al. ........... 248/465.1 |
| 5,974,556 * | 10/1999 | Jackson et al. ............... 713/322 |
| 5,987,890 * | 11/1999 | Chiu et al. ..................... 62/3.2 |

* cited by examiner

VERTICAL DOCKING AND POSITIONING APPARATUS FOR A PORTABLE COMPUTER

CLAIM OF PRIORITY

This application claims the benefit of U.S. Provisional Application No. 60/101,424, filed Sep. 22, 1998, and entitled Vertical Positioning Apparatus For A Portable Computer.

SUMMARY OF INVENTION

This invention relates to the field of portable computers, and to devices that are used in conjunction with portable computers such as mounts and docks. More specifically, the present invention relates to an apparatus for positioning a portable computer in an inclined configuration for purposes of adjustably raising the height of the display and for cooling the computer.

Definitions

The term portable computer includes laptops and notebook computers, and some Personal Digital Assistants. Typically, these computers have a flat-panel display connected to a base by a hinge. The display is shut for transport or storage, and rotated open for use. The base may contain an integral or removable keyboard on the top surface, electronic components, printed-circuit boards, storage media, batteries, and other components. A portable computer may also feature other user-interface systems, such as a pen-based interface as in a tablet configuration, instead of, or in addition to, a keyboard.

A subnotebook computer is defined as a portable computer that is de-featured to make it substantially smaller in some dimension, usually in thickness. This smaller size makes it more convenient to transport. Typically, subnotebooks do not contain a removable media drive such as a floppy drive, or other components that are less frequently used.

A Personal Digital Assistant (PDA) is defined as a computing device that is greatly de-featured and much smaller in size than a portable computer. Some PDAs may fit inside a shirt pocket. Typically, PDAs provide much less computing performance and are considered special purpose computing devices.

A dock, including expansion docks, docking stations, and port replicators, is defined as an apparatus to which a portable computer is electrically and mechanically connected, for purposes of expanding the computer's utility. Docks typically increase the number of communication and expansion ports for networking and adding peripheral components such as external drives, removable media drives, graphics cards and the like.

An office environment is defined as a continuously utilized work site where a to portable computer user has access to some or all of the following: desk space, AC power, networks and other communication lines, and computer peripheral devices such as printers.

BACKGROUND OF THE INVENTION

The rapid growth of the portable computer market demonstrates that computer users prefer the freedom to work in different locations that these computers afford. Increasingly, portables are being purchased by both individuals and large firms as desktop replacement computers. Many users have a home office that constitutes an office environment. As a result, there is a need for portables that can provide performance comparable to desktop computers. Many portable owners use the machine a majority of the time in an office environment, often times connected to a dock. Use outside of an office environment may include working at various locations in the home, on a plane, or in hotel rooms.

One drawback with typical portable computers is that they do not provide an ergonomic environment that many users desire when working on computers for long periods of time in an office environment. Specifically, many users prefer the computer display to be at eye level. When the portable computer is used on a table or desk, the display is typically well below the user's eyes, thus forcing the user to bend their head forward and down to view the display. This is not as much of a problem outside the office environment, because such remote uses tend not to be for long periods of time. However, when the portable computer is used in the office environment, many users desire the computer screen to be elevated to reduce neck and shoulder strain that can occur over long periods of computer use. Typical portable computers simply do not provide a way to elevate the screen for use in an office environment. In addition, a portable computer laying flat on a desktop uses up significant workspace, especially if an external keyboard is used.

Another concern with portable computers is reduced performance due to the limited ability of portable computers to dissipate internally generated heat. Computing performance is mainly considered to be the speed by which the central processing unit (CPU) can execute numerical computations, although the speed of access to data stored in disk drives is also a widely used performance criteria. For any given circuit architecture, speed is governed mainly by the clock-speed of a microprocessor. In fact, computer models are marketed in large part by the speed rating, in megahertz, of the main system clock. High performance portable computers may also include the ability to handle a range of lo media types such as high capacity hard disk drives, CD-ROMs, or DVDs; fast, high-resolution video processing; and connectivity functionality provided by networking and other ports.

Unfortunately, there is a problem combining all of these components into a single, small enclosure. As the system tends toward thermal equilibrium, the thermal sum of the components raises the temperature above the manufacturer's specified operating temperature limits of some or all of the components. CPUs in particular have a proportional relationship between processing power and thermal output. In order to cool these devices, portable computers must include a combination of heat moving and dissipating components such as fans, planar heat spreaders, heat exchangers, heatpipes, and heatsinks.

The size and weight of portable computers are some of the most important performance constraints. Given similar computing performance features, users prefer to purchase the product with the smallest form factor and lightest weight. In fact, many consumers make the purchase decision based on the advertised length, width, and thickness dimensions of the product. Therefore, it is undesirable to have to include the various heat dissipating components mentioned above.

As a result of these forces, portable computers are nearing the limit of the amount of heat that can be dissipated from a given volume associated with the portable. Subnotebooks are especially constrained in terms of the amount of heat removing components that can be contained in them and still meet subnotebook size requirements. The cooling problem is exacerbated by the fact that the external surfaces that are the most efficient for natural convection heat transfer, the horizontal top and vertical surfaces, cannot exceed certain temperatures in order to dissipate heat because the user can touch them. Excessive temperatures on these surfaces would cause discomfort or injury if the user came in contact. Furthermore, there is a UL touch temperature limit for plastic surfaces that manufacturers usually do not exceed.

There is a need for a device that elevates the display of a portable computer for comfortable viewing and increasing space efficiency of the desktop, while aiding in the dissipation of internally generated heat, to provide for maximum ergonomic and computational performance equal to desktop computers when used in an office environment.

SUMMARY OF THE INVENTION

The present invention solves the aforementioned problems by providing a docking and support device that supports the base of a portable computer in an inclined position, thus saving desk space and raising the portable computer for better viewing. The docking and support device can also facilitate cooling of the portable computer mounted thereon.

The positioning device of the present invention, for supporting a portable computer, includes a base member for placing on a horizontal surface, a support plate for supporting the portable computer at an inclined position relative to the base member, a hinge that rotatably connects the base member to the support plate so that the support plate can be rotated between multiple angular positions relative to the base member, and a lock mechanism for selectively fixing the angular position between the base member and the support plate.

In another aspect of the present invention, a portable computer includes a base housing having a front and rear end, a flat panel display rotatably attached to the rear end of the base housing, a keyboard attached to a top surface of the base housing, a support member rotatably attached to the front end of the base housing so that the support member can be rotated between multiple angular positions relative to the base housing, and a lock mechanism for selectively fixing the angular position between the support member and the base housing so that the support member supports the base housing at an inclined position.

Other objects and features of the present invention will become apparent by a review if the specification, claims and appended figures.

DETAILED DESCRIPTION OF THE PROFFERED EMBODIMENTS

Figure 1:
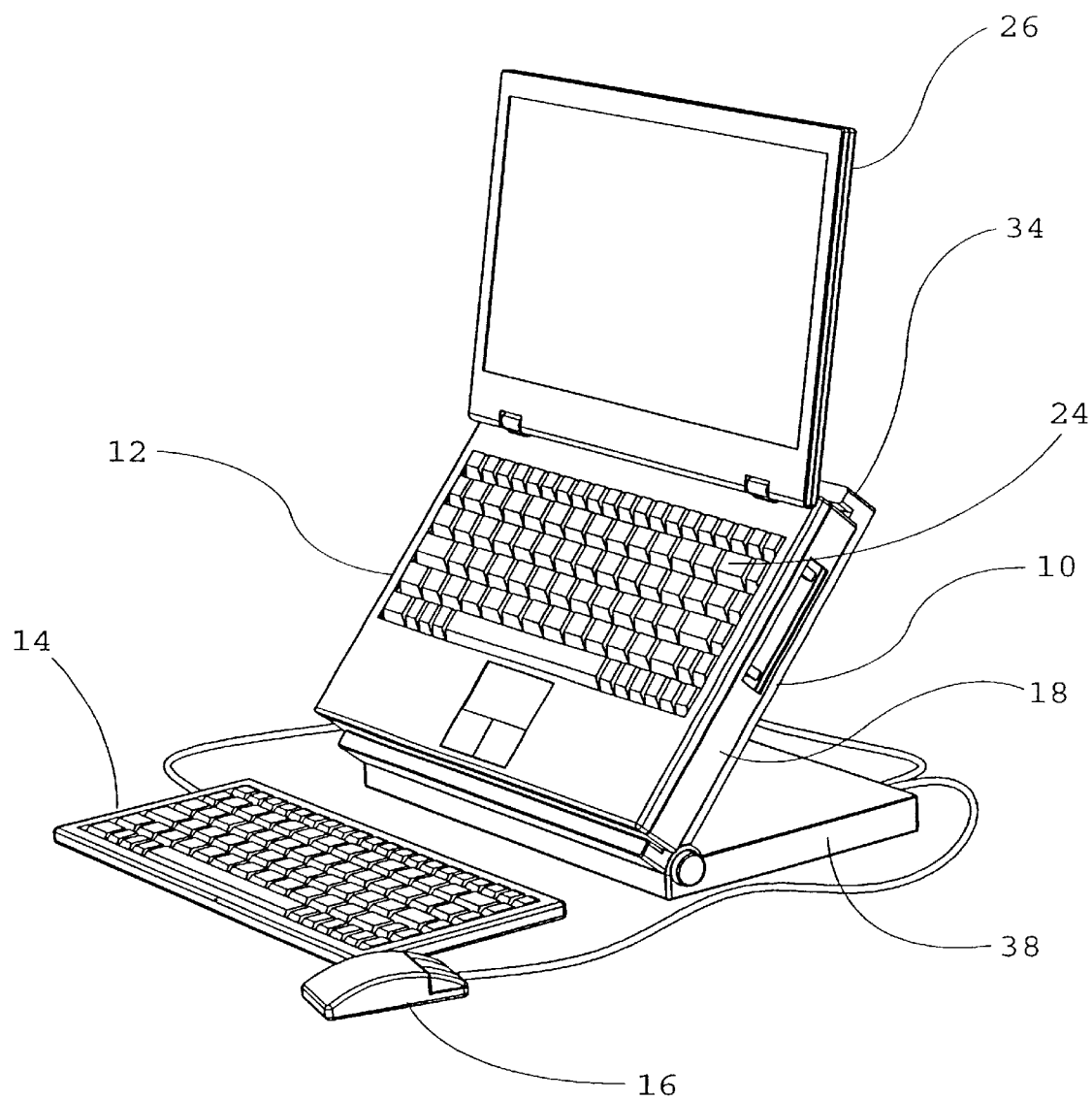
FIG. 1 is a front perspective view of the portable computer docking/positioning device of the present invention.

The portable computer docking and positioning device 10 of the present invention is illustrated in FIG. 1, along with a conventional folding laptop portable computer 12, an external keyboard 14 and a mouse 16. The present invention supports the portable computer in an inclined position for better viewing and for increased desktop space efficiency. The present invention can also help increase the heat dissipation efficiency of the portable computer.

Figure 2:
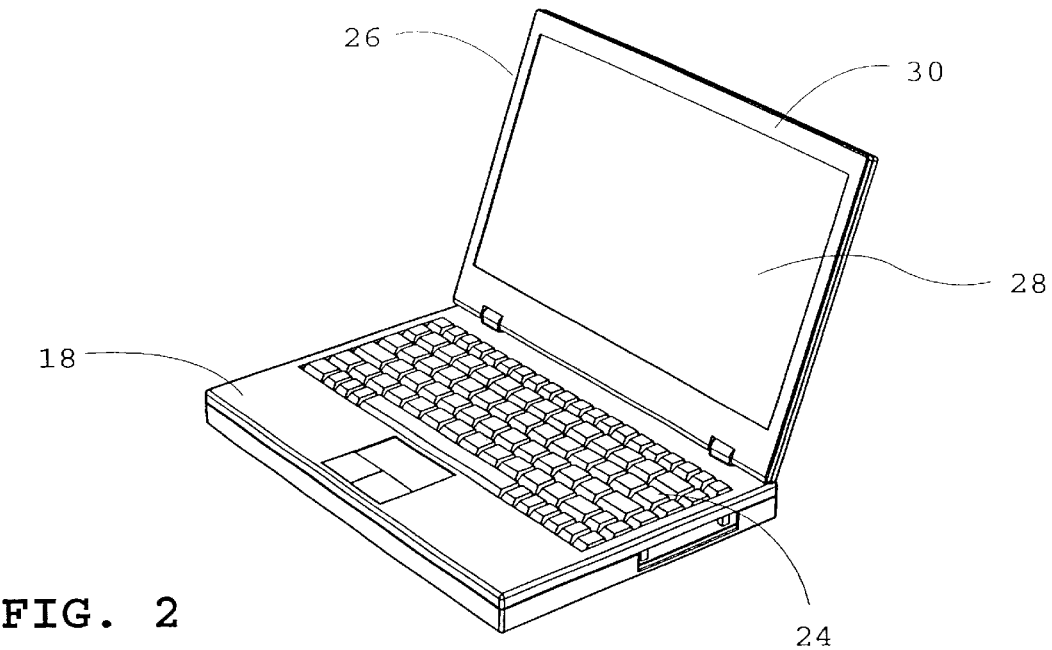
FIG. 2 is a perspective view of a portable computer.
Figure 3:
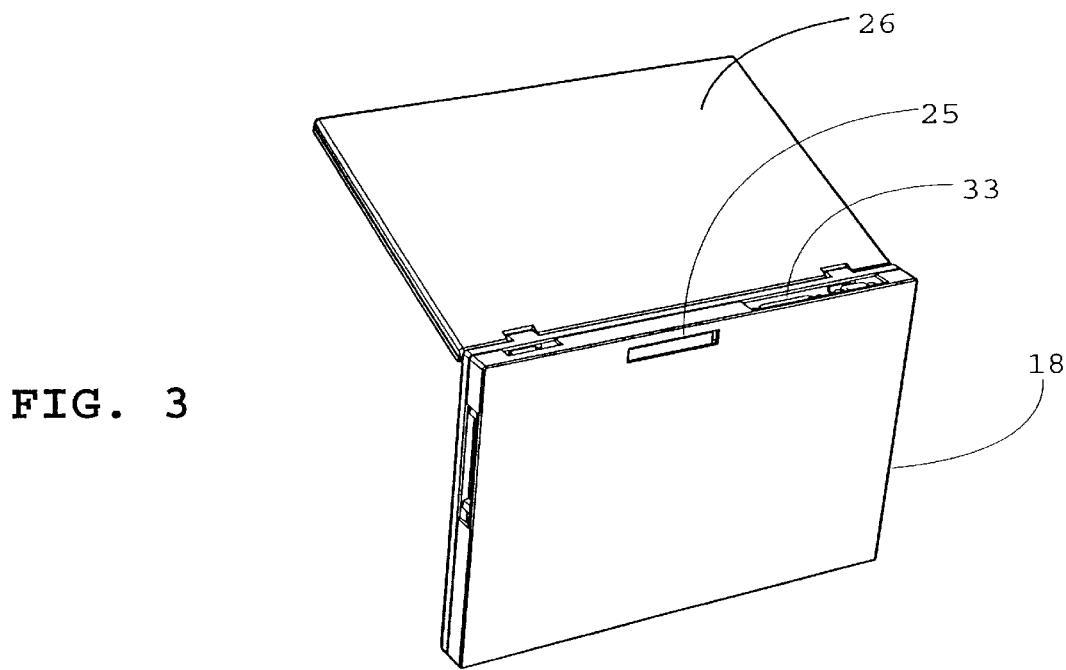
FIG. 3 is a bottom perspective view of the portable computer.
Figure 4:
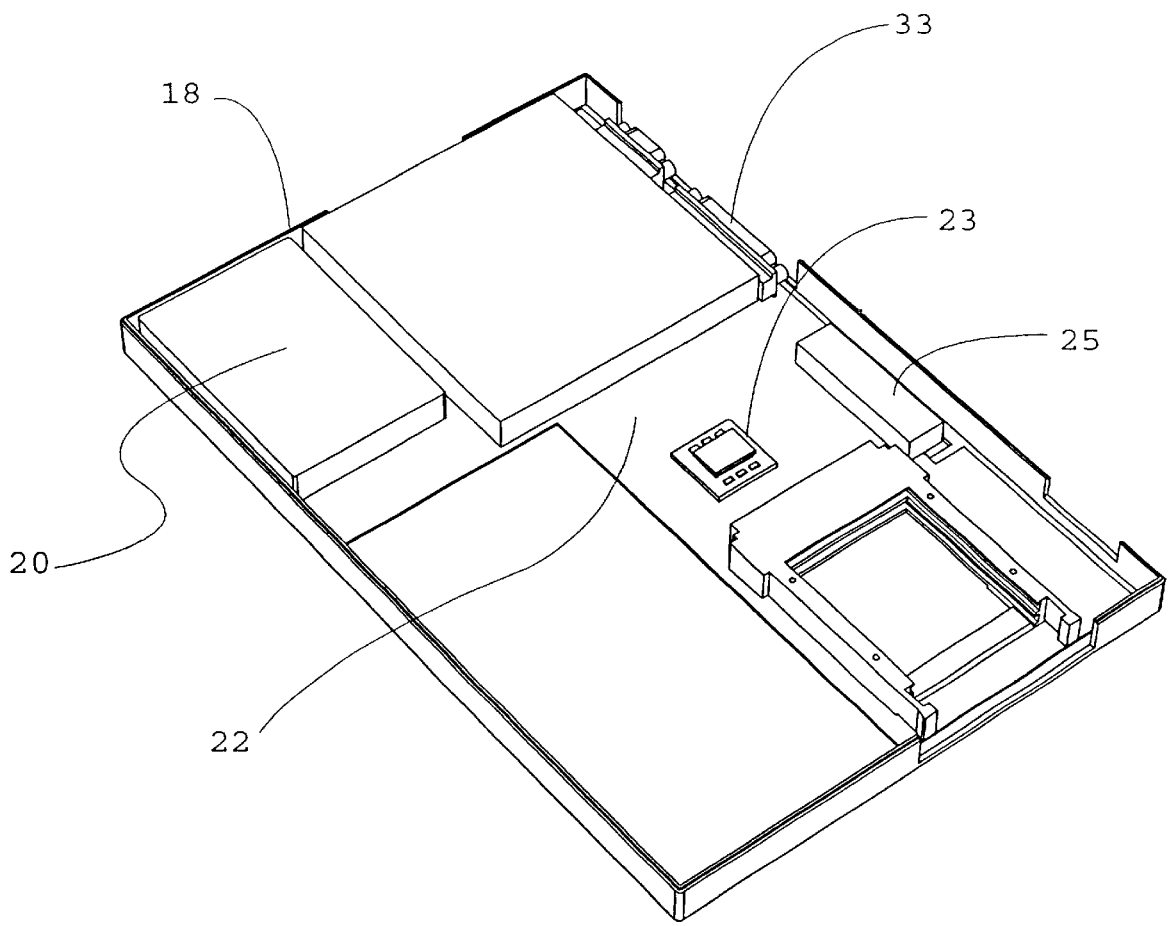
FIG. 4 is a perspective view of the internal components of the portable computer.
Figure 6:
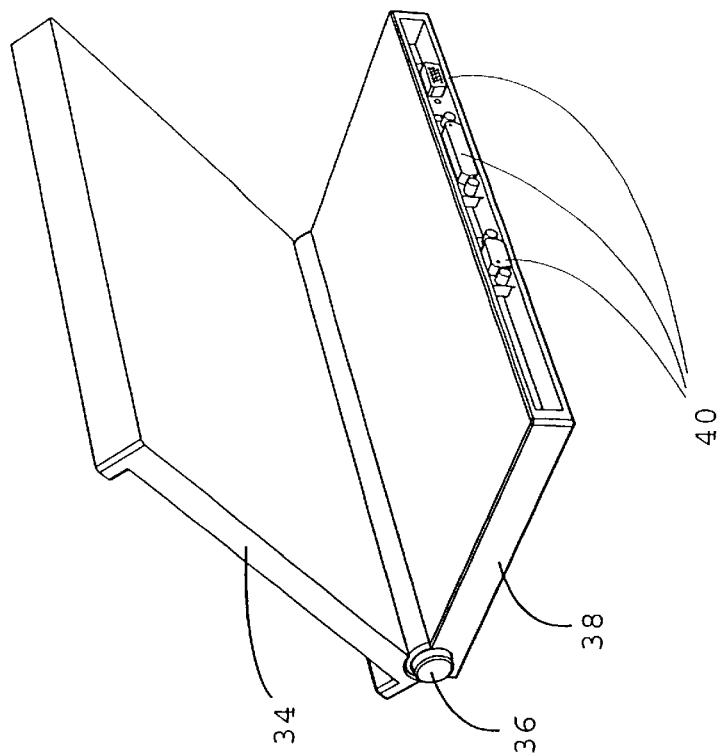
FIG. 6 is a rear perspective view of the portable computer docking/positioning device of the present invention.
Figure 5:
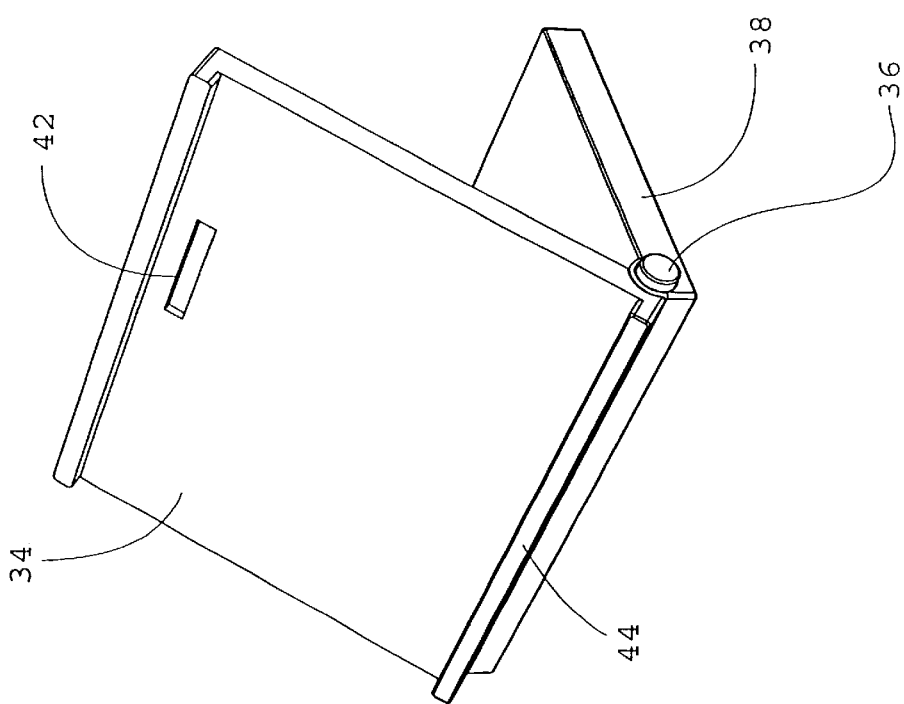
FIG. 5 is a front perspective view of the portable computer docking/positioning device of the present invention.

The portable computer 12 is further illustrated in FIGS. 2–4, and includes a base 18 containing a disk drive 20 and a motherboard 22 with a microprocessor 23, both of which are heat-producing components. A portable-side docking connector 25 is located on the bottom surface of portable computer 12, and a set of input/output (I/O) port connectors 33 are located on the back side of the portable computer, which are well known in the field of portable computer design. The remaining contents of base 10 are well known in the art of portable computer design and will not be further addressed here. A keyboard 24 is located on the top surface of base 18. A flat-panel display (FPD) module 26 is pivotally attached to base 10. FPD module 26 consists of a flat panel display (FPD) 28, a front bezel 30, and a rear cover 32. As shown in FIG. 1, when portable computer 12 is docked, FPD module 26 is rotated open approximately 160 degrees from its closed storage position against base 18. This angle is adjusted by the user and is based on the position of the user and the desired height of FPD 28.

Now referring to FIGS. 5–9, docking/positioning device 10 includes a support docking plate 34, an angle-adjustment mechanism 36, and a dock base 38 containing a set of dock input/output (I/O) connectors 40 (second electrical connector). Dock I/O connectors 40 may consist of all of the I/O ports 33 that are located on portable computer 12 itself, thus the docking/positioning device 10 is serving the function of a port replicator. Alternatively, dock I/O connectors 40 may contain new input/output functionality, such as expansion busses, etc. Dock base 38 may also contain other processing circuitry such as integrated circuits components and connectors that may add new functions such as a networking function. Dock I/O connectors 40 also include connectors for external keyboard 14 and mouse 16, as shown in FIG. 1. Docking plate 34 can also include a connection for power, which could either be an internal AC adapter or a plug for an external AC adapter. There is also a power connection between portable computer 12 and docking plate 34. These types of connectors are well known in the field of portable computer design and will not be further addressed here.

A dock plate connector 42 is formed in docking plate 34 to engage with docking connector 25 of portable computer 12. Dock plate connector 42 is electrically connected to dock I/O connectors 40 via a flexible printed circuit board, ribbon connector, etc. This type of electrical connection is well known in the field of electronic enclosure design and will not be presented in detail here. When portable computer 12 is in position on docking plate 34, docking connector 25 of portable computer 12 mates with dock plate connector 42 so that electrical signals are successfully passed from portable computer 12 to dock I/O connectors 40. Docking plate 34 also includes a lower support ledge 44, configured as a right angle member attached or formed with the docking plate 34. When portable computer 12 is placed on docking plate 38, the front surface of base 18 rests against and is supported by lower support ledge 44. Although support ledge 44 is shown as a fixed position member, adjustably attached support members could also be used here.

Figure 7A:
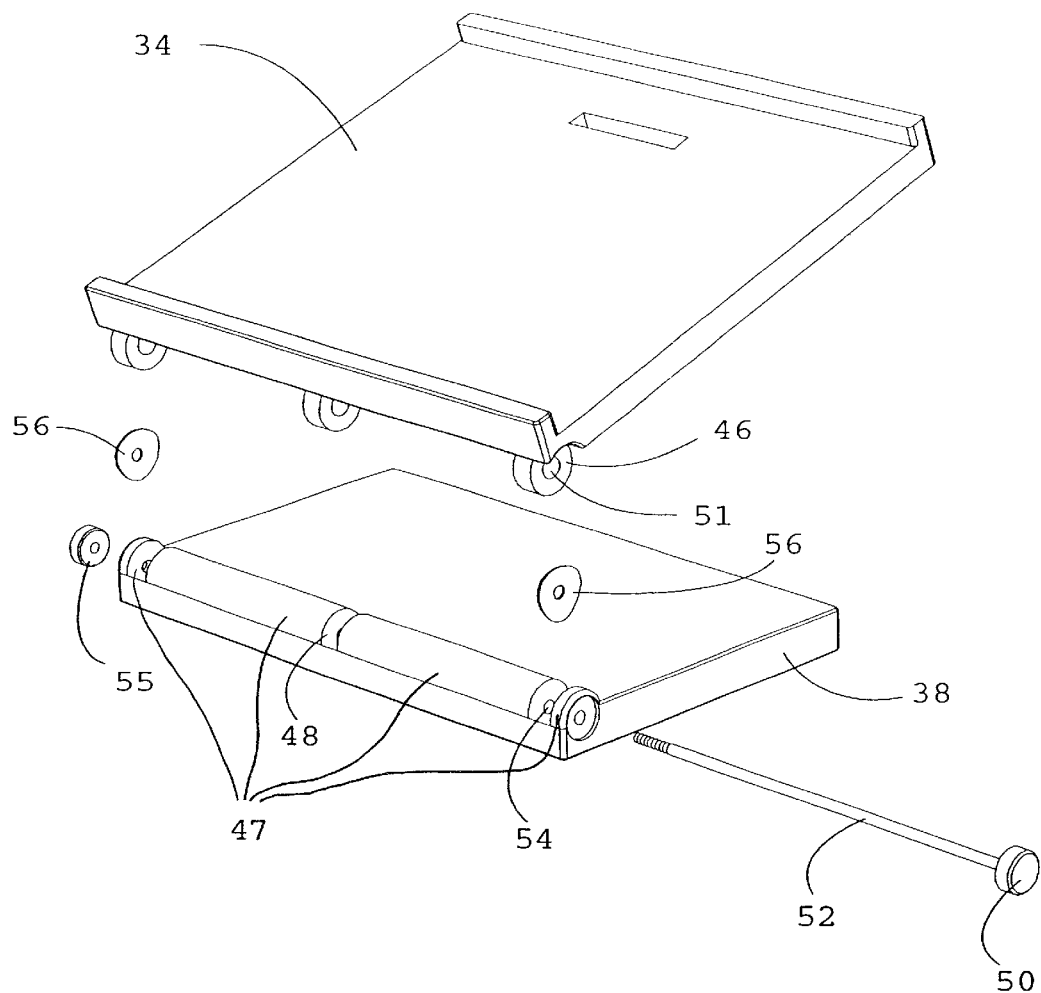
FIG. 7a is an exploded view of the portable computer docking/positioning device of the present invention.

Angle-adjustment mechanism 36 consists of a screw-tightened friction hinge system, as illustrated in FIG. 7. Pivot disks 46 (support hinge protrusions) extend from and are positioned orthogonally to docking plate 34, and are positioned between corresponding base hinge protrusions 47 that form pivot disks slots 48 on dock base 38 when docking plate 34 and dock base 38 are assembled. Angle-adjustment knob 50 is fixedly attached to a threaded axle 52, which extends through a hole 51 in each pivot disk 46 when pivot disks 46 are correctly aligned in pivot disk slots 48. Threaded axle 52 is in bearing contact with a cylindrical hole 54 through the dock base 38 and pivot disks 46, but this hole 54 is not threaded so threaded axle 52 can rotate freely in cylindrical hole 54 to engage a threaded nut 55. Spring washers 56 are included as shown in FIG. 7, between adjacent surfaces on pivot disks 46 and in pivot disk slots 48 on dock base 38. Spring washers 56 are preferably constructed of thin spring steel, and may be available in a variety of profiles to exert a specified friction force between pivot disks 46 and dock base 38.

Operation

Portable computer 12 is placed onto the front surface of docking plate 34. In this position, portable computer docking connector 25 mates electrically and mechanically with dock plate connector 42. Docking plate 34 can be selectively fixed at an infinite number of angled positions with respect to dock base 38 when angle adjustment knob 50 and threaded axle 52 are engaged with threaded lock nut 55 and rotated to a tightened state. When angle-adjustment knob 50 and threaded lock nut 55 are rotated to a tightened state, the resulting compression by threaded axle 52 forces the outside surfaces of the outer pivot disk slots 48 of dock base 38 inwardly against the corresponding surfaces of pivot disks 46. Spring washers 56 increase the rotational friction between the surfaces on pivot disks 46 and in pivot disks slots 48, which are forced together.

When angle-adjustment knob 50 is rotated such as to reduce or remove the normal load between the corresponding surfaces of pivot disks 46 and pivot disk slots 48, docking plate 34 can rotate about dock base 38. The dimensions of pivot disks 46, pivot disk slots 48 and spring washers 56 would be selected so there would always be some friction in the system to prevent portable computer 12 from falling abruptly when threaded axle 52 is loosened for the purpose of adjusting the angle of docking plate 34. Preferably, the user would have to apply some extra load to move the angle of docking plate 34. Docking plate 34 is thus pivotally and fixedly connected to dock base 38 via angle-adjustment mechanism 36.

Figure 7B:
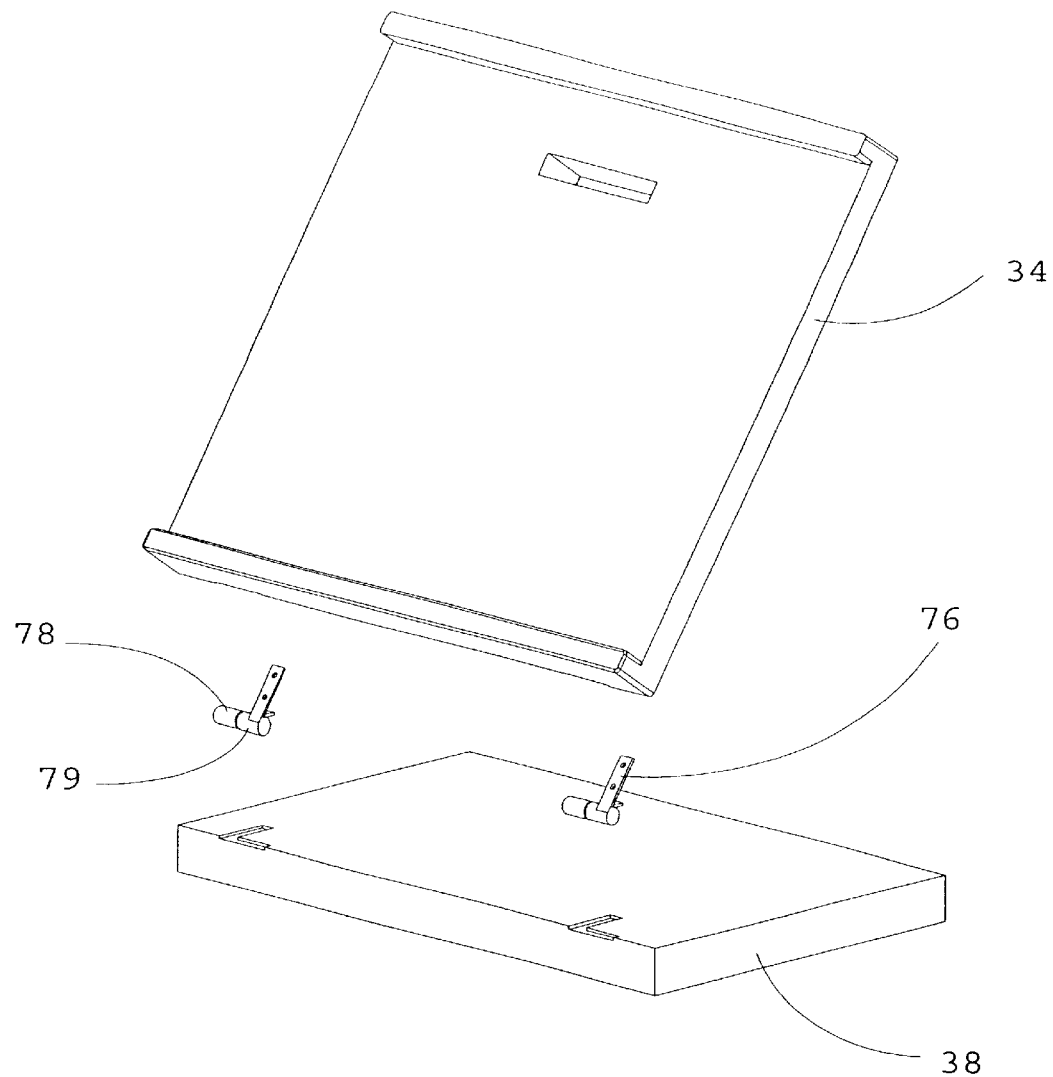
FIG. 7b is an exploded view of an alternate embodiment of the angle adjustment mechanism used in the present invention.

Although spring washers 56 are used in this embodiment, other means to introduce friction or a locking action between pivot disks 46 and the corresponding surfaces in pivot disks slots 48 may be used, such as including small radial slots in the corresponding surfaces. Alternately, friction hinges 76 similar to those made by Cema Technologies of Bridgeport, Pa. can be used, as illustrated in FIG. 7b. In this embodiment, dock base 38 and docking plate 34 are pivotally and fixedly connected by friction hinges 76, which are torque limiting mechanisms that allow the elements that are connected to them to rotate with respect to one another with a substantially constant frictional force throughout the range of the pivot motion. A first half 78 of friction hinge 76 is fixedly attached to dock base 38, while its mating second half 79 is fixedly attached to docking plate 34. Friction hinges 76 are well known in the field of portable computer design and are commonly used in pairs, although any number of friction hinges 76 could be used.

Figure 8B:
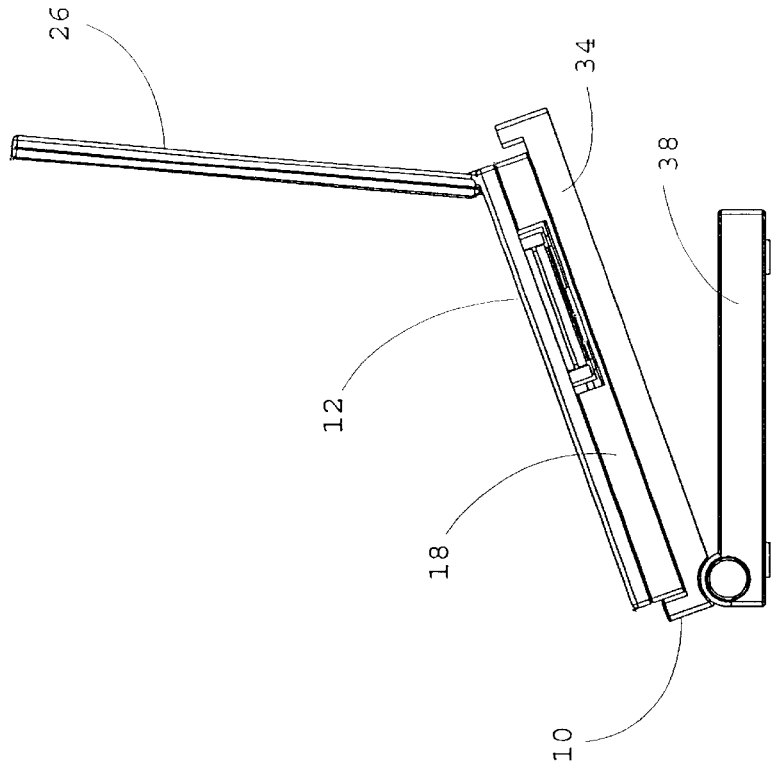
FIGS. 8a–b are side views of the portable computer and the docking/positioning device of the present invention illustrating the different angles of adjustment.
Figure 8A:
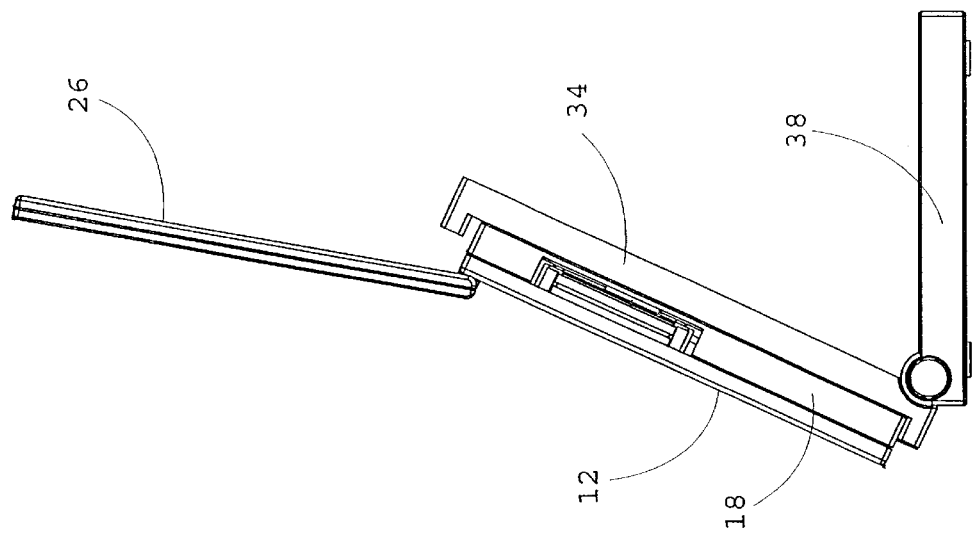

Now referring to FIGS. 8a–b, portable computer 12 and docking/positioning device 10 are shown from the side. Depending on the preference of the user, the angle between docking plate 34 and dock base 38 can be changed, thus changing the height of FPD module 26. At these various angle settings, the angle of FPD module 26 must be adjusted to maintain the optimum degree of viewing contrast to the user. The present invention takes up less desk space than if the portable computer were laying flat on the desk.

Figure 9:
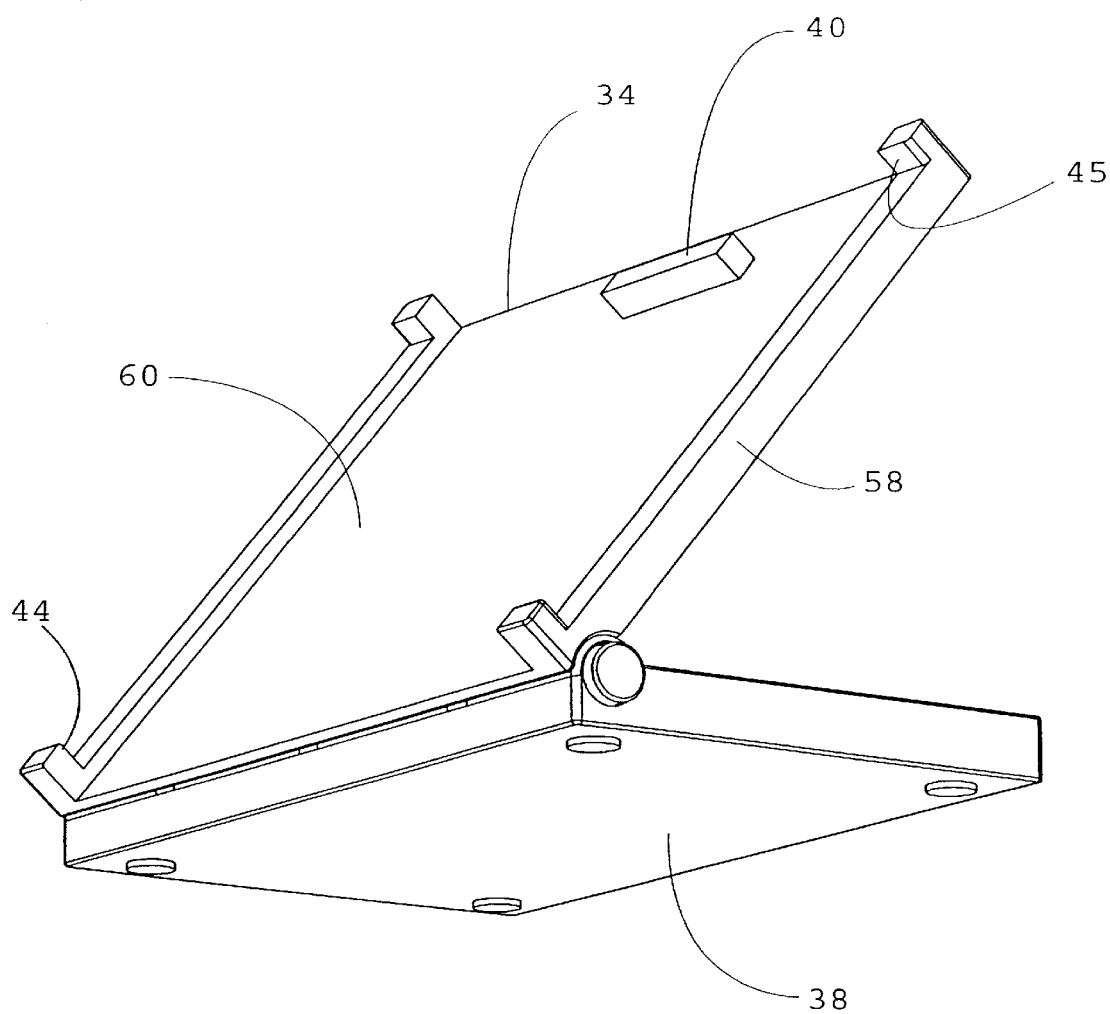
FIG. 9 is a bottom perspective view of the portable computer docking/positioning device of the present invention.

In an alternative embodiment, docking/positioning device 10 can also be used as a means for cooling portable computer 12, as well as for providing a height adjustable support. As shown in FIG. 9, docking plate 34 has an airflow channel 60 formed between two raised side rails 58. Lower/upper support ledges 44/45 support the computer 12 in place. In the preferred embodiment, side rails 58 extend above the surface of airflow channel 60 by about 4–7 mm to formed a gap between the docking plate 34 and the computer 12. Because the docking plate 34 is inclined toward the vertical during use, air in channel 60 that is heated by the bottom surface of computer 12 flows upwardly through the 4–7 mm gap, thus drawing cooler air from underneath that cools the bottom surface of computer 12.

Figure 10A:
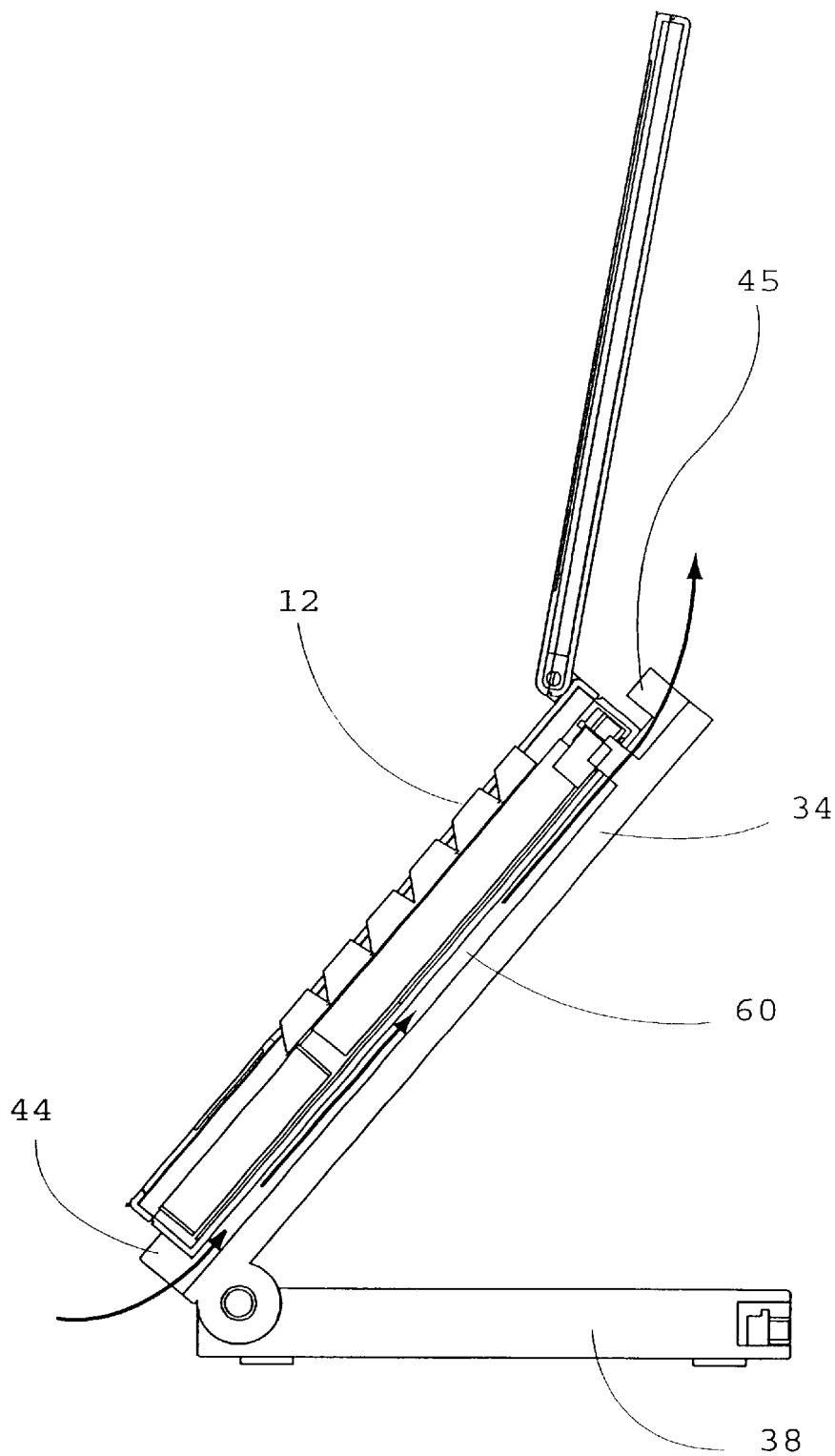
FIG. 10a is a side section view of the portable computer docking/positioning device of the present invention, showing circulating cooling air flow.
Figure 10B:
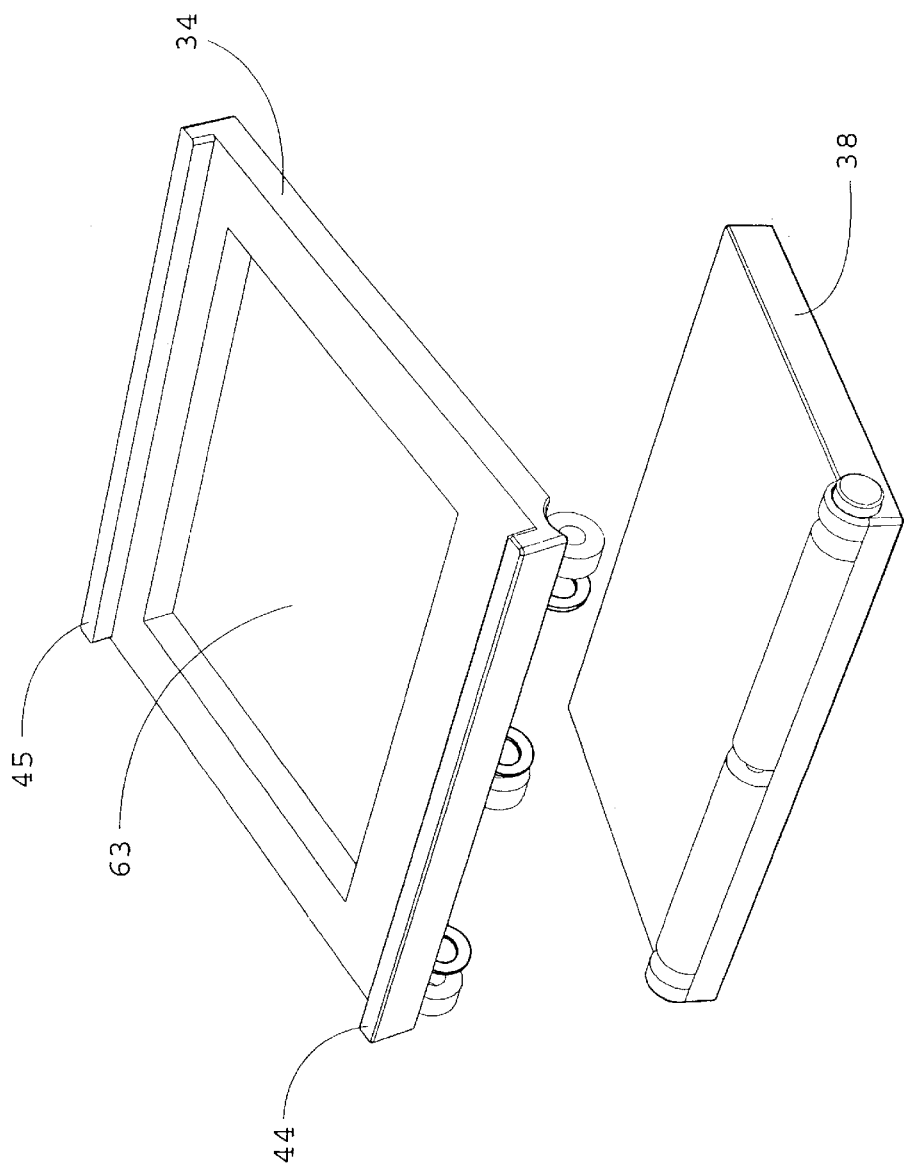
FIG. 10b is an exploded perspective view of the portable computer docking/positioning device of the present invention, showing a cooling aperture.
Figure 11:
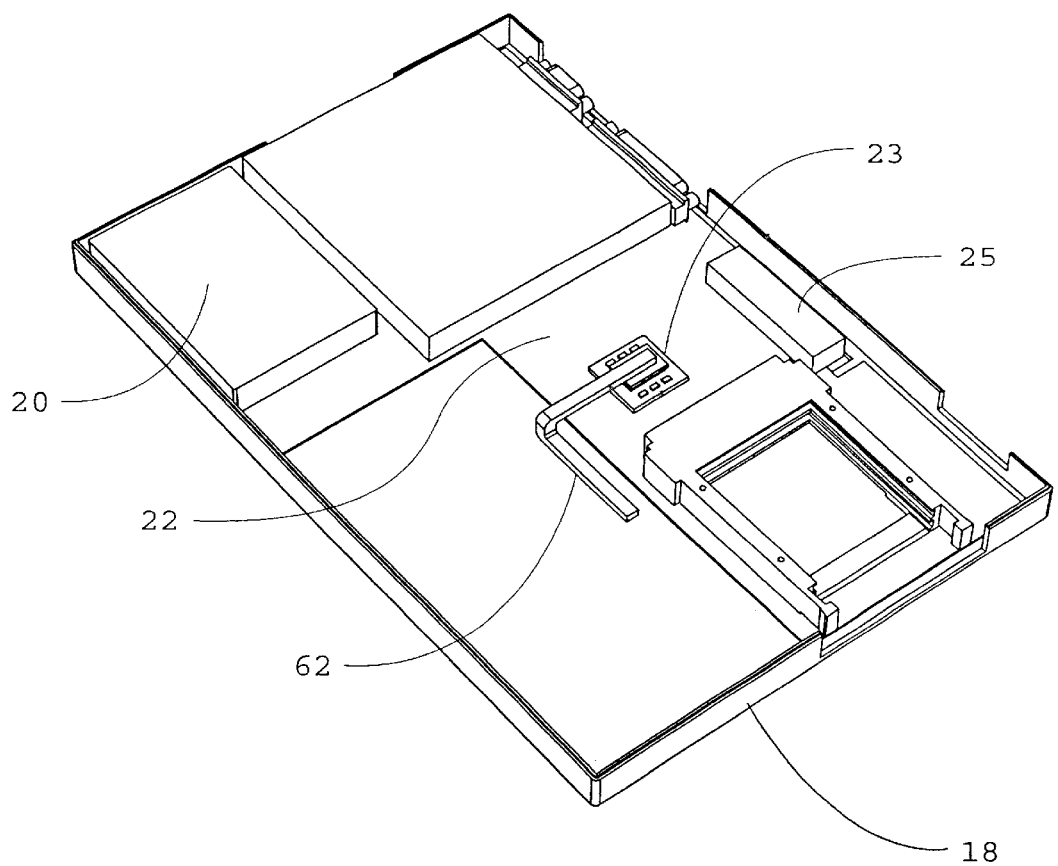
FIG. 11 is a top perspective view of the computer base with the top removed.

As shown in FIG. 11, the microprocessor 23 is preferably thermally connected to bottom the surface of base 18 via a heatpipe 62. Heatpipes 62 and thermal connections of this type are well known in the art of portable computer design and will not be described further in detail so as not to obscure the present invention. The bottom surface of base 18 consists of a thermally conductive material such as aluminum or magnesium alloy, or it may consist of plastic with a thermally conductive plate on the inside, but thermally connected to the bottom surface of base 18. Thus, heat from microprocessor 23 is transported to and spread across the bottom surface of base 18. Now referring to FIG. 10a, which is a cross-sectional side view of portable computer docking/positioning device 10, cooling air flows in through the lower opening created by airflow channel 60 in support ledge 25, up past the bottom of base 18, and out through the opening created by airflow channel 60 in the top edge of docking plate 34. This airflow, depicted by the arrows in FIG. 10a, occurs because the docking plate 34 is inclined toward the vertical, and the heat in the bottom outside surface of base 18 is transferred to the air next to it in airflow channel 60, causing this air to rise. This air is replaced by air entering airflow channel 60 at the bottom of docking plate 34. This continuous convection process effectively cools the hot components inside portable computer 12. Additionally, one or more cooling apertures 63 can be formed in docking plate, as illustrated in FIG. 10b, to help dissipate heat to the ambient air.

Figure 12:
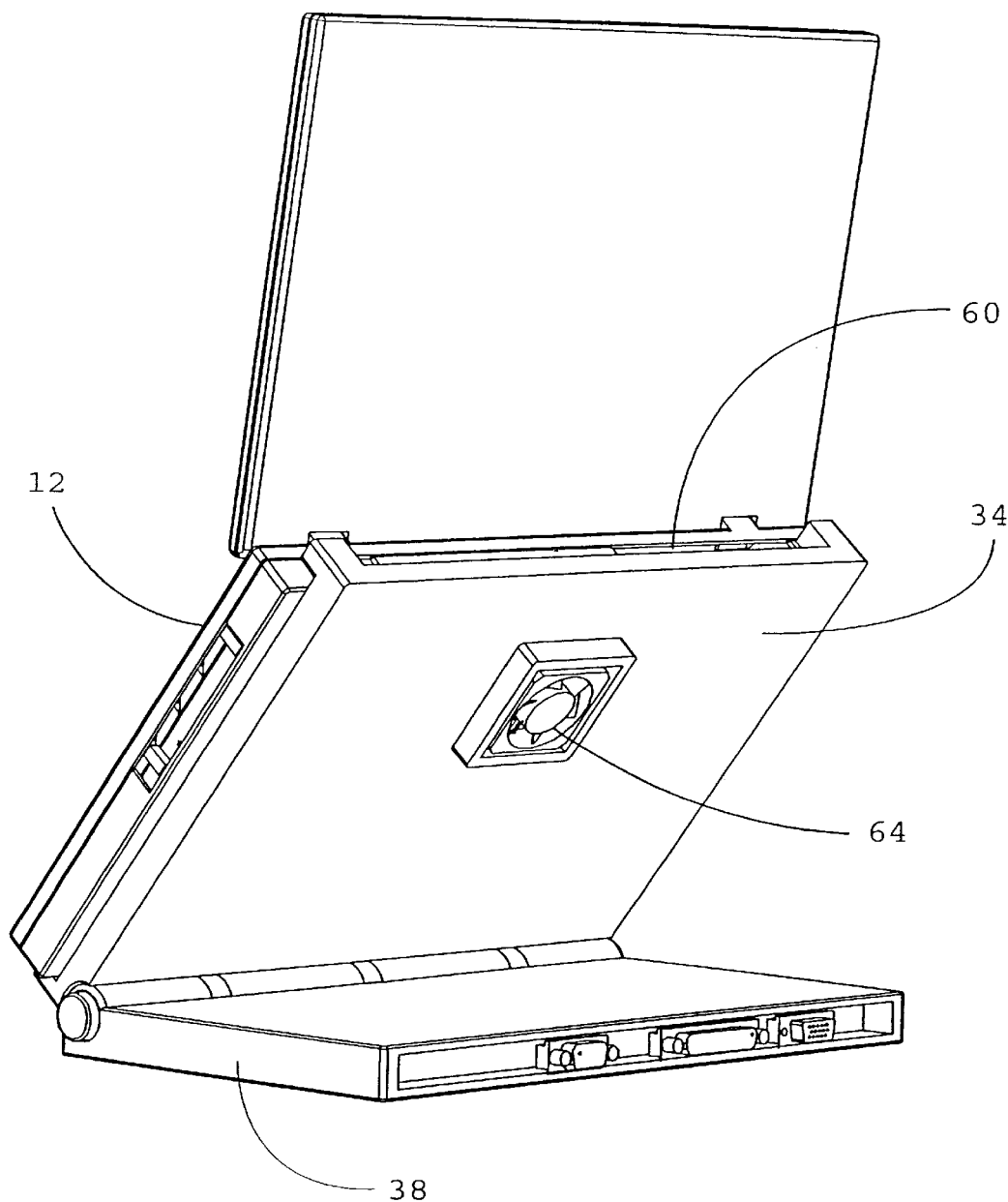
FIG. 12 is a rear perspective view of the portable computer docking/positioning device of the present invention equipped with a fan.
Figure 13:
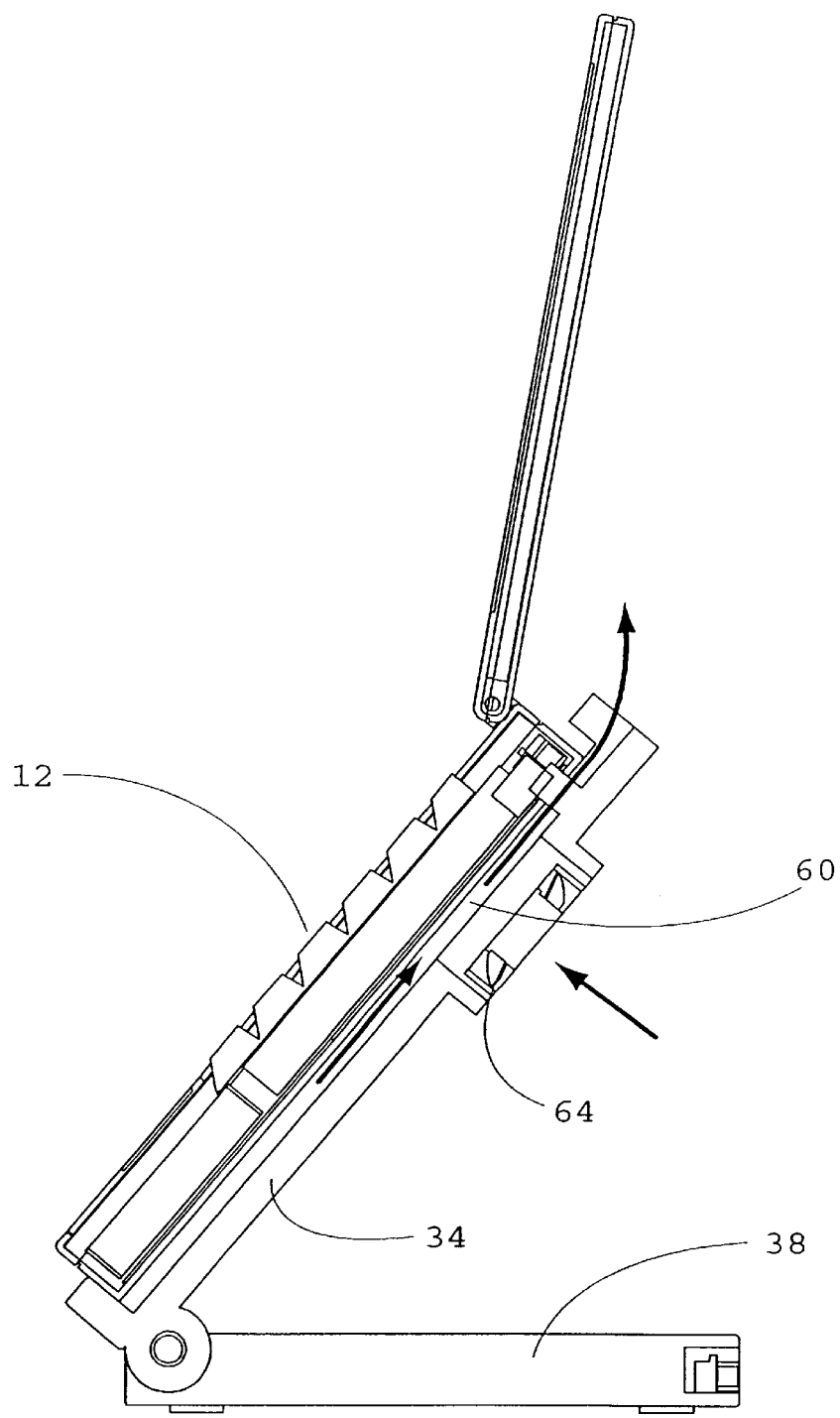
FIG. 13 is a side section view of the portable computer docking/positioning device of the present invention equipped with a fan.

FIG. 12 shows a fan 64 incorporated into docking plate 34 to promote additional cooling of portable computer 12. Fan 64 is positioned to the rear side of docking plate 34 such that airflow from fan 64 is forced into airflow channel 60. In this embodiment, airflow channel 60 does not extend through support ledge 44, that is, support ledge 44 effectively blocks air from flowing out through the bottom of portable computer 12 mounted in the docking/positioning device 10. Air is forced from the rear of fan 64 on docking plate 34, into airflow channel 60, up past the bottom outside surface of base 18, and out the top opening of airflow channel 60. The flow of air is depicted by the arrows in FIG. 13.

Figure 14:
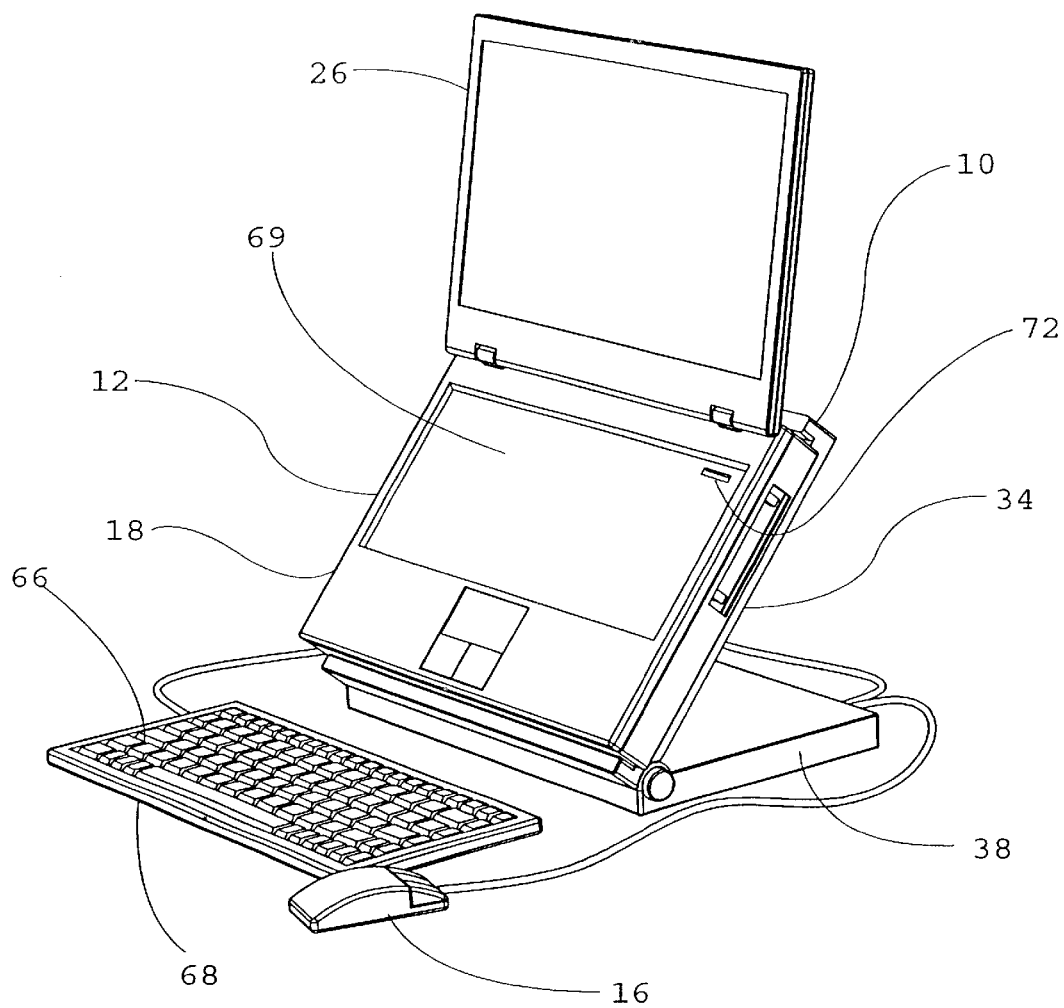
FIG. 14 is front perspective view of the portable computer docking/positioning device of the present invention with a removable keyboard module.
Figure 15:
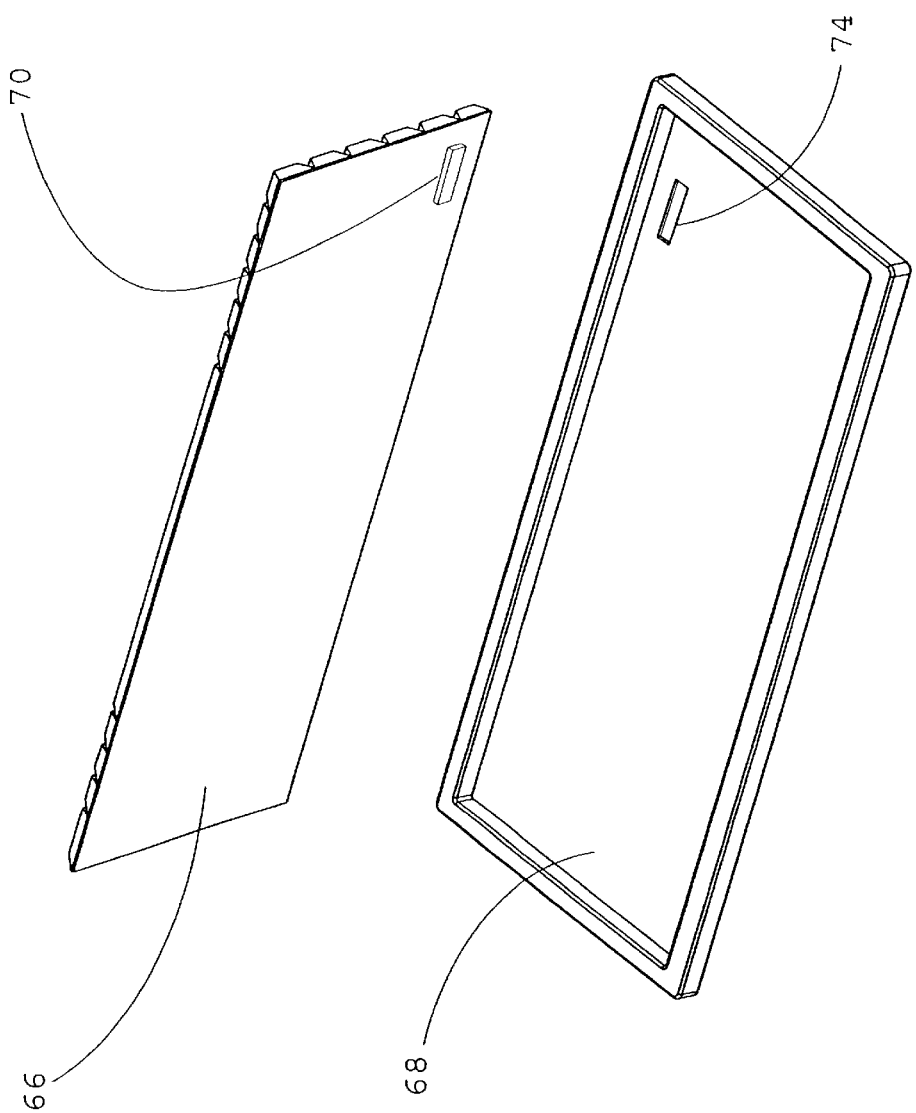
FIG. 15 is an exploded view of the keyboard module.

FIG. 14 shows portable computer docking/positioning device 10 implemented with a keyboard module 66 that is removable and mountable in a keyboard module external case 68. When portable computer 12 is used in an undocked configuration, keyboard module 66 is located inset into the top surface of base 18, in a keyboard indent 69. Signals from keyboard module 66 are transferred to base 18 through the mating of a keyboard module connector 70 (second keyboard electrical connector) and a keyboard module base connector 72 (first keyboard electrical connector). When portable computer 12 is mounted in docking plate 34, keyboard module 66 can be removed from the top surface of base 18 and placed into keyboard module external case 68. In FIG. 15, the keyboard module 66 is separated from keyboard module external case 68, showing the keyboard module connector 70 on the underside of keyboard module 66, and keyboard module external case connector 74 (third keyboard electrical connector) on keyboard module external case 68, which connects the keyboard module to the computer. The space where keyboard module 66 is mounted on the top side of base 18 (in keyboard indent 69) can provide an extra heat dissipation surface when portable computer 12 is mounted on docking plate 34 and keyboard module 66 is removed. A heatpipe or other heat transporting device can connect a heat source to the surface on which keyboard module 66 rests when keyboard module 66 is mounted on base 18. In this design, the surface on which keyboard module 66 rests on base 18 is preferably a thermally conductive material such as thin aluminum stamped sheet metal.

Figure 16:
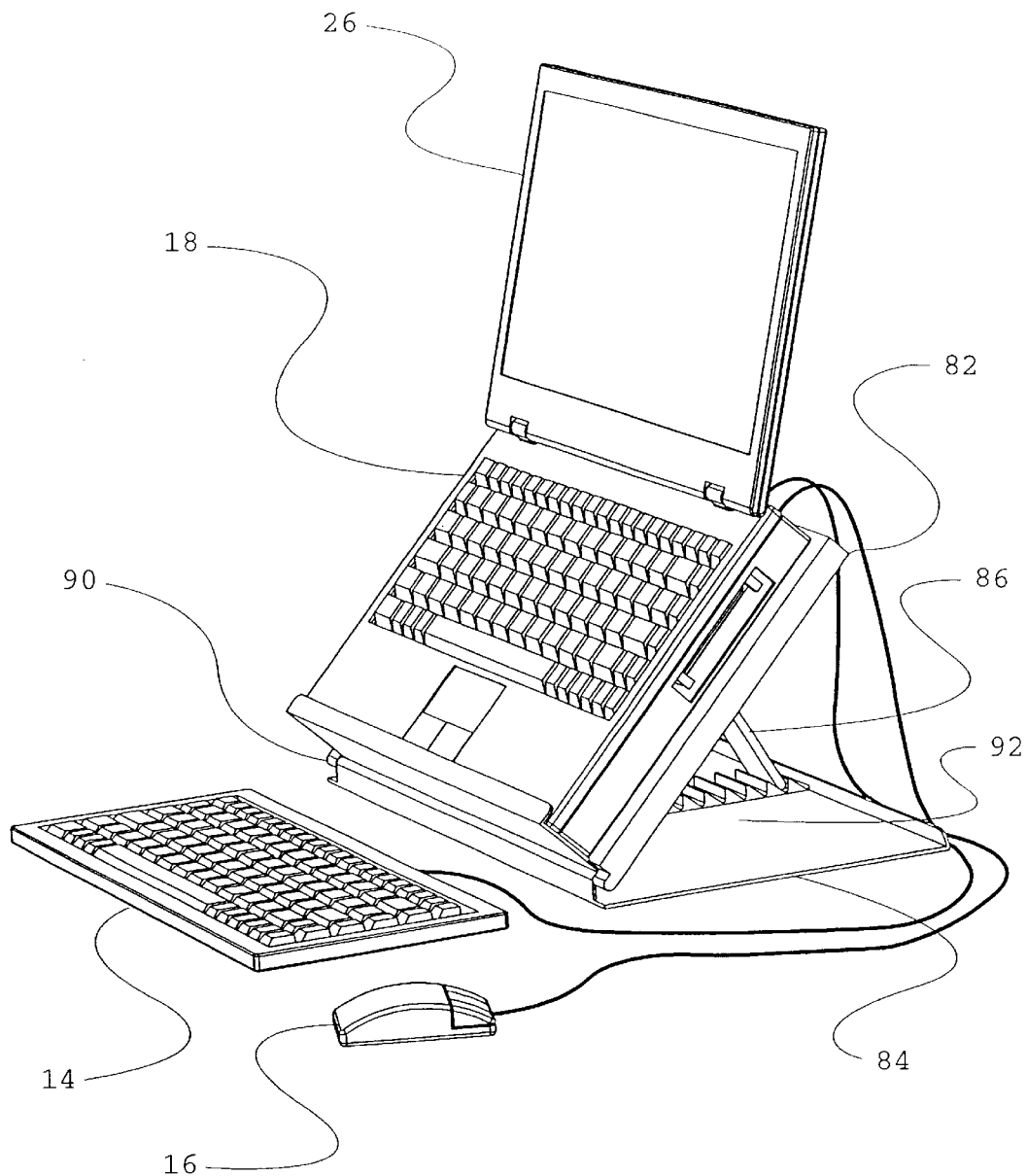
FIG. 16 is a front perspective view of the portable computer docking/positioning device of the present invention with a post and ratchet locking mechanism.
Figure 17:
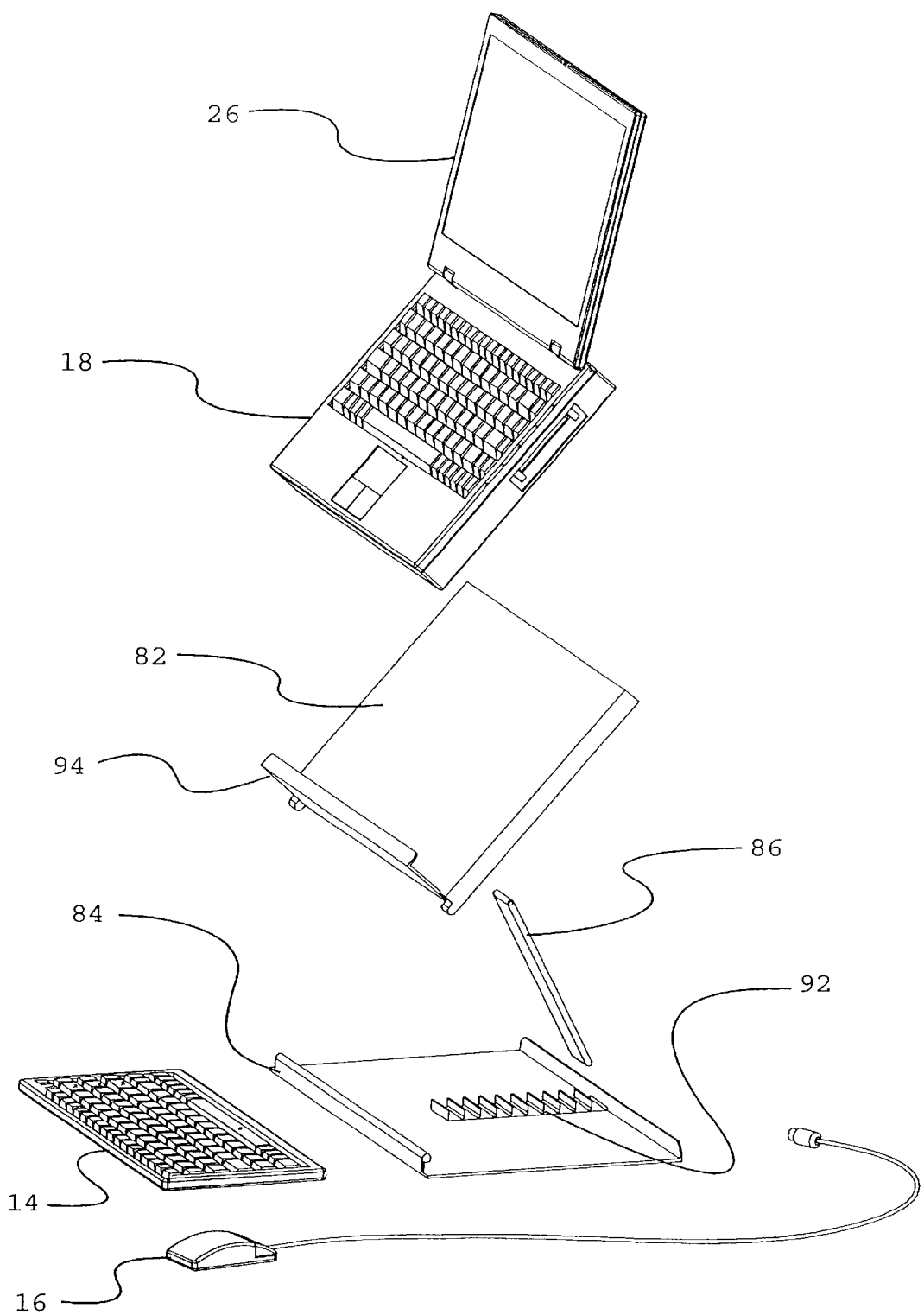
FIG. 17 is a front exploded assembly view the portable computer docking/positioning device of the present invention with a post and ratchet locking mechanism.
Figure 18:
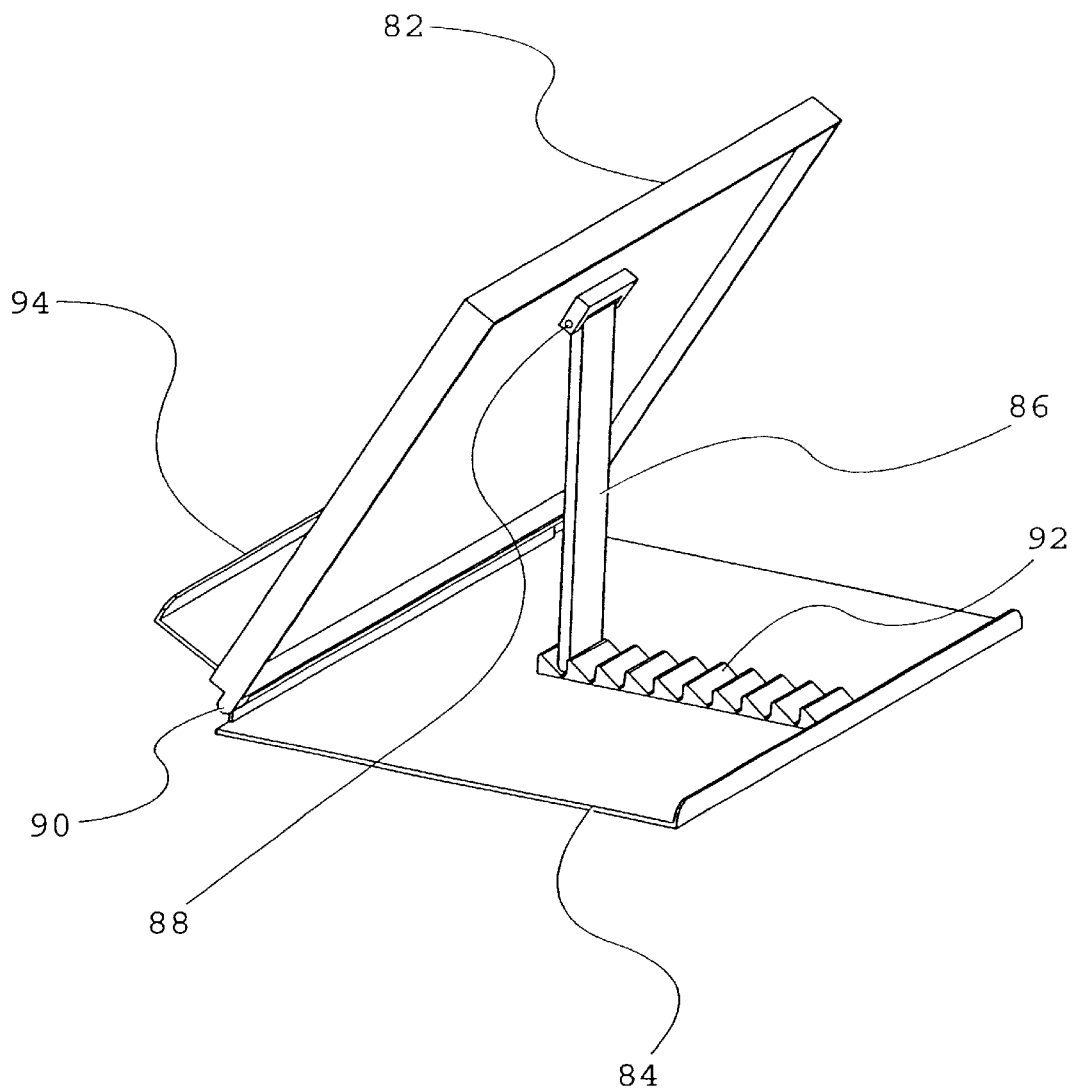
FIG. 18 is a rear view of the portable computer docking/positioning device of the present invention with a post and ratchet locking mechanism.

Another embodiment of the present invention is shown in FIGS. 16–18, where portable computer docking/positioning device 80 utilizes a different kind of locking mechanism. Portable computer positioning device 80 includes a support plate 82 and a base 84. A post 86 is pivotally attached to support plate 82 orthogonally and adjustably by a bearing pin 88, and rotates freely in relation to support plate 82 in a plane perpendicular to the plane of support plate 82. Support plate 82 and base 84 are pivotally attached together by a hinge 90 parallel to the axis of the bearing pin 88. The free end of post 86 is selectively positionable in ratchet teeth 92 on base 84 to constrain rotation of post 86 and thereby determine the angle of support plate 82 in relation to base 84. A support ledge 94 is attached perpendicularly to support plate 82 and adjacent to hinge 90 to support the portable computer 12 in an inclined position on support plate 82. An external keyboard 14 and mouse 16 are used when portable computer 12 is disposed on the positioning device 80. This embodiment is shown with the external keyboard 14 and mouse 16 connected directly to computer I/O ports 33. However, electric connectors and cables can be incorporated in docking/positioning device 80 as described in previous embodiments. It should be noted that the post 86 could be pivotally attached to the stand base 84, and ratchet teeth 92 can be formed on the support plate 82.

Next, the operation of portable computer positioning device 80 will be explained. Portable computer 12 is placed onto the front surface of the support plate 82. In this position, the front face of portable computer 12 rests against support ledge 94. The angle of support plate 82 in relation to base 84 is determined by the longitudinal position of post 86 as it rests in ratchet teeth 92 of base 84. Changing the position of post 86 rotates support plate 82 about hinge 90 to adjust the angle of support plate 82. The angle of support plate 82 is determined by the user's preference for the height of FPD module 26. At each angled position of support plate 82, the user may have to adjust the angle of FPD module 26 with respect to computer base 18 to assure maximum FPD 28 contrast.

Although the description above contains many specifics, these should not be construed as limiting the scope of the invention, but merely providing illustration of some of the presently preferred embodiments of this invention. The angle adjustment of any of the above systems could be implemented as a series of discrete angles, as illustrated in FIG. 17, or it could be implemented as an infinitely adjustable mechanism as illustrated in FIG. 7.

Figure 19A:
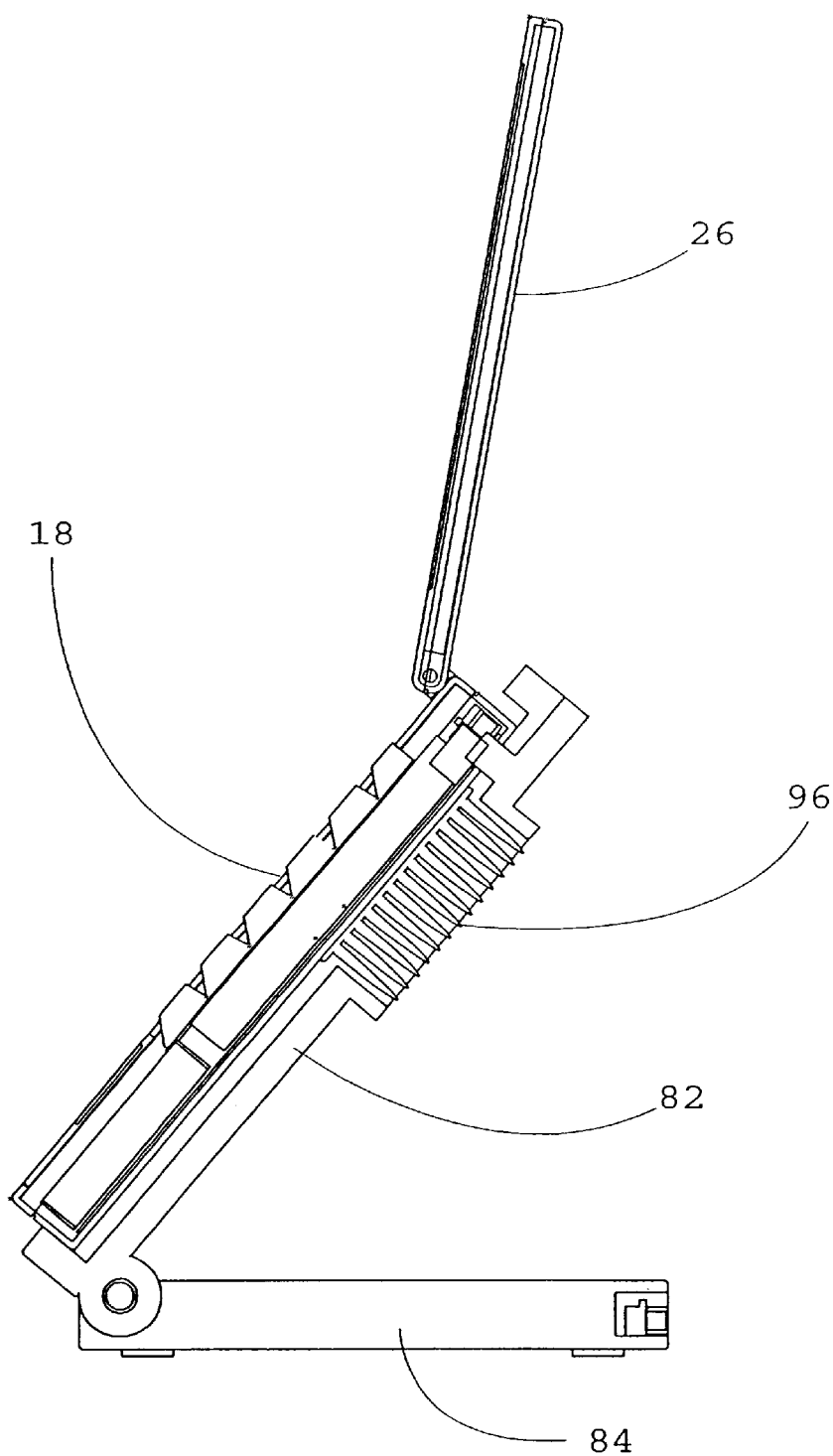
FIG. 19a is a cross-section side view of the portable computer docking/positioning device of the present invention with cooling fins.
Figure 19B:
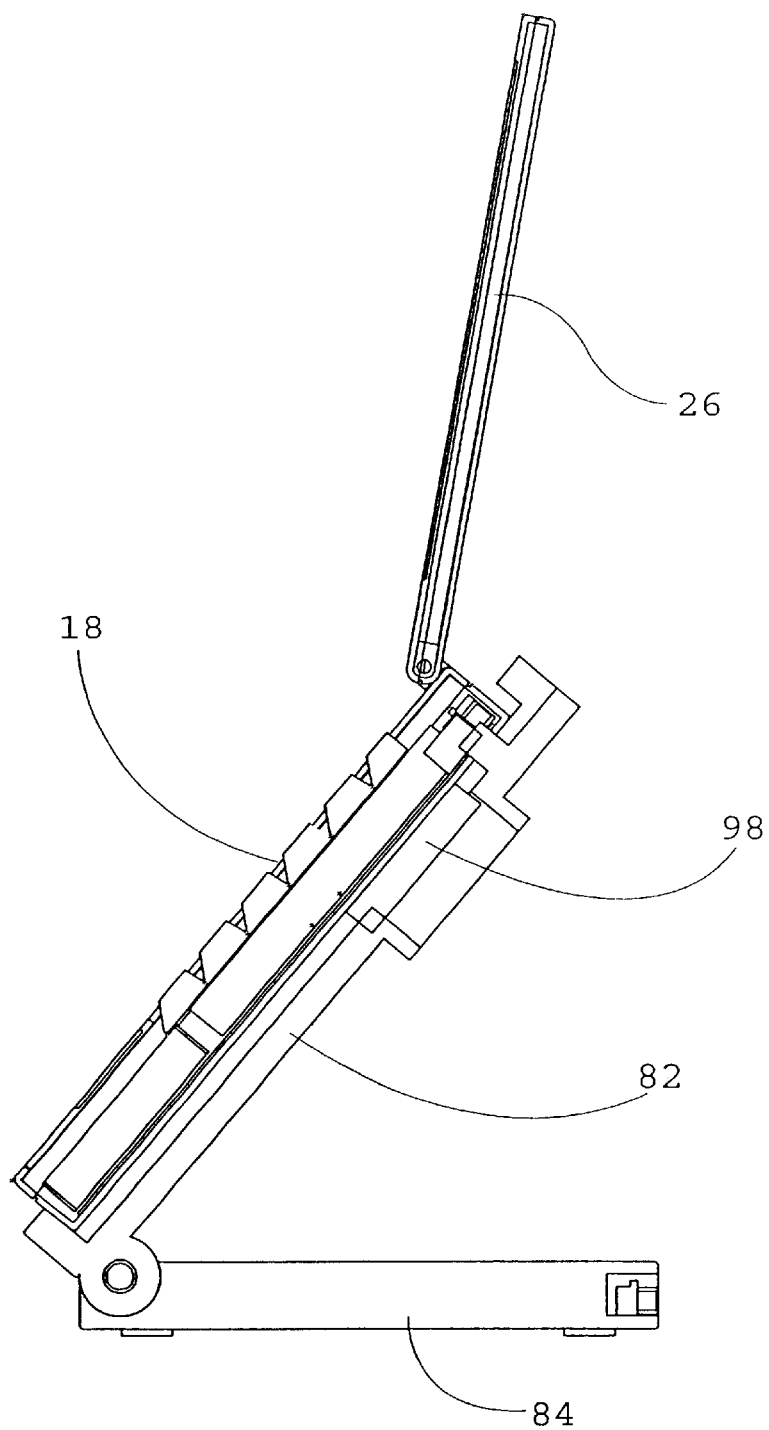
FIG. 19b is a cross-section side view of the portable computer docking/positioning device of the present invention with a thermoelectric unit.

A heat sink could be added to support plate 82 that would contact the bottom outside surface of computer base 18 and thereby remove heat via conduction. The heat sink could include fins 96 to increase its surface area, as illustrated in FIG. 19*a*, or include a thermoelectric unit 98, as illustrated in FIG. 19*b*.

Figure 20:
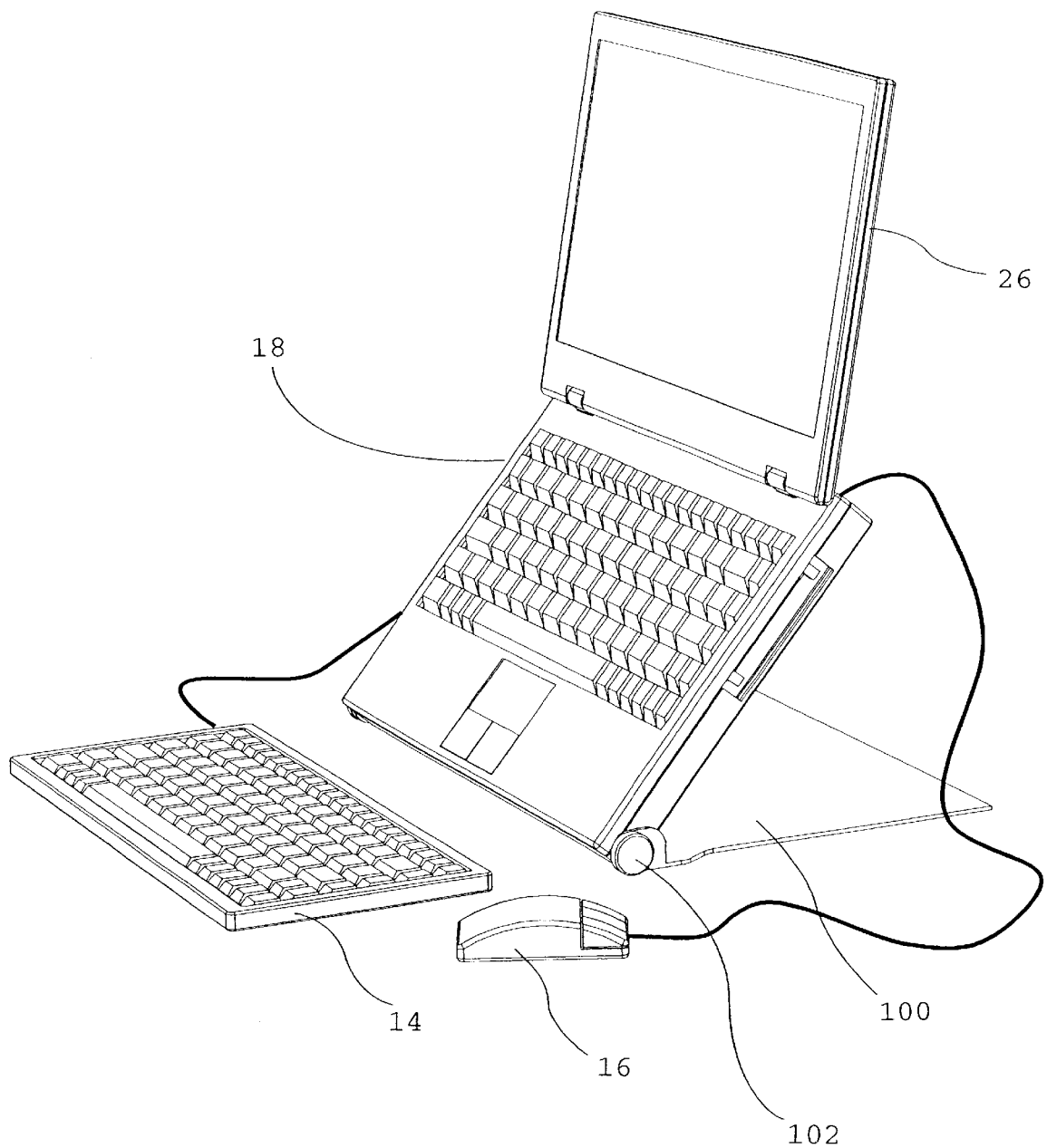
FIG. 20 is a front perspective view of a portable computer of the present invention with an integral hinging base plate.
Figure 21:
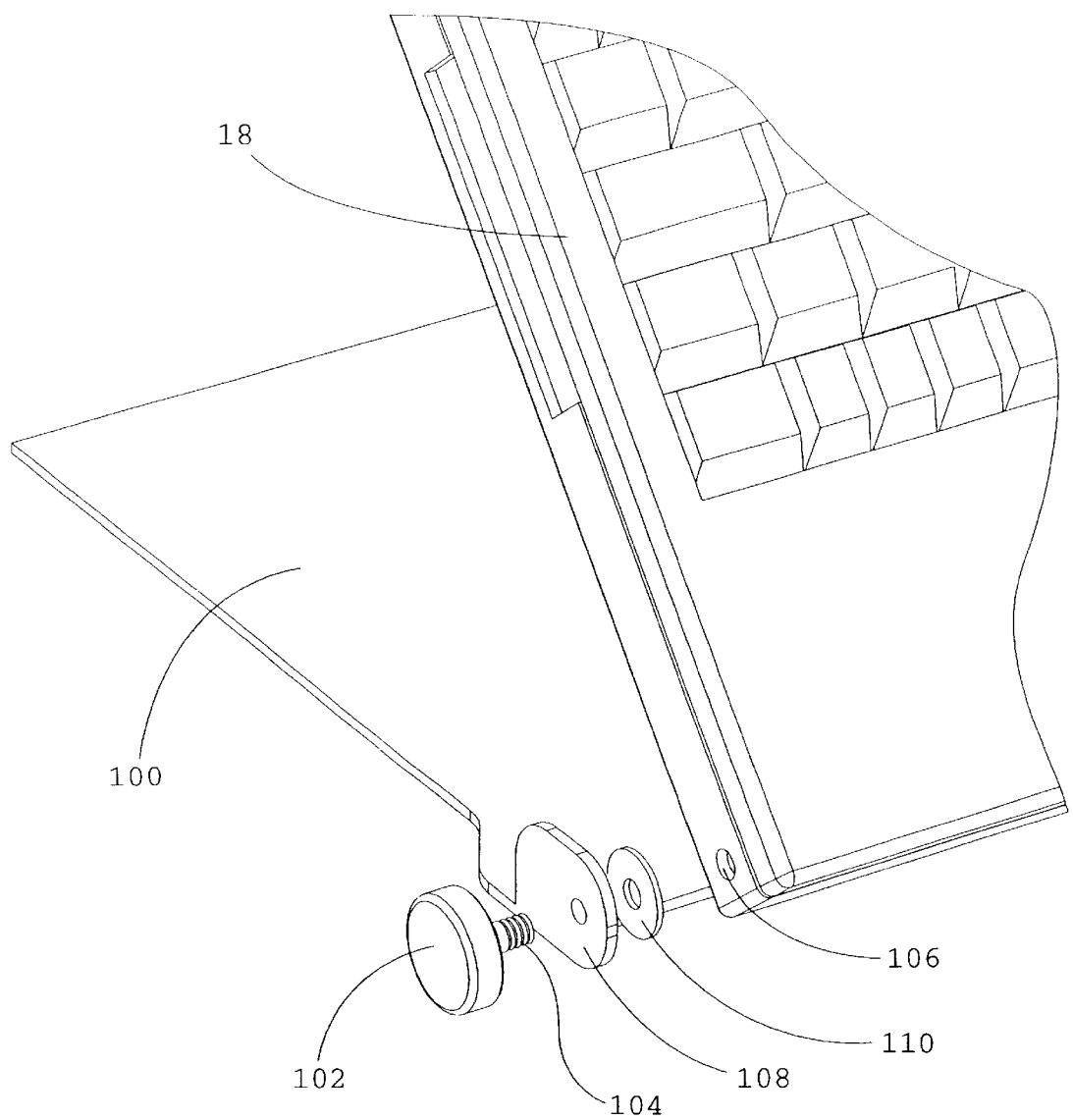
FIG. 21 is a partial exploded view of the portable computer of the present invention with integral hinging base plate.

Now referring to FIG. 20, a portable computer of the present invention is designed with a base plate 100 that is pivotably connected thereto near the front end of computer base 18. As shown in FIG. 21, an angle adjustment knob 102 includes threaded axle 104 that engages a threaded hole 106 in portable computer base 18. The act of rotating angle-adjustment knob tightens angle-adjustment knob 102, forcing a pivot member 108 of base plate 100 and a friction disk pad 110 against the side of computer base 18. The friction created by this assembly holds the portable computer at the specified angle chosen by the user. Likewise, when the user readies the portable computer for storage or transport, angle-adjustment knobs 102 are loosened and base plate 100 is rotated adjacent to computer base 18. This embodiment is ideal because base plate 100 in its closed position can cover up hot computer components or plates to protect the user or desk surface. However, when the computer is used with the base plate extended out as illustrated in FIG. 20, the hot computer components or plates are exposed for heat dissipation.

Figure 22:
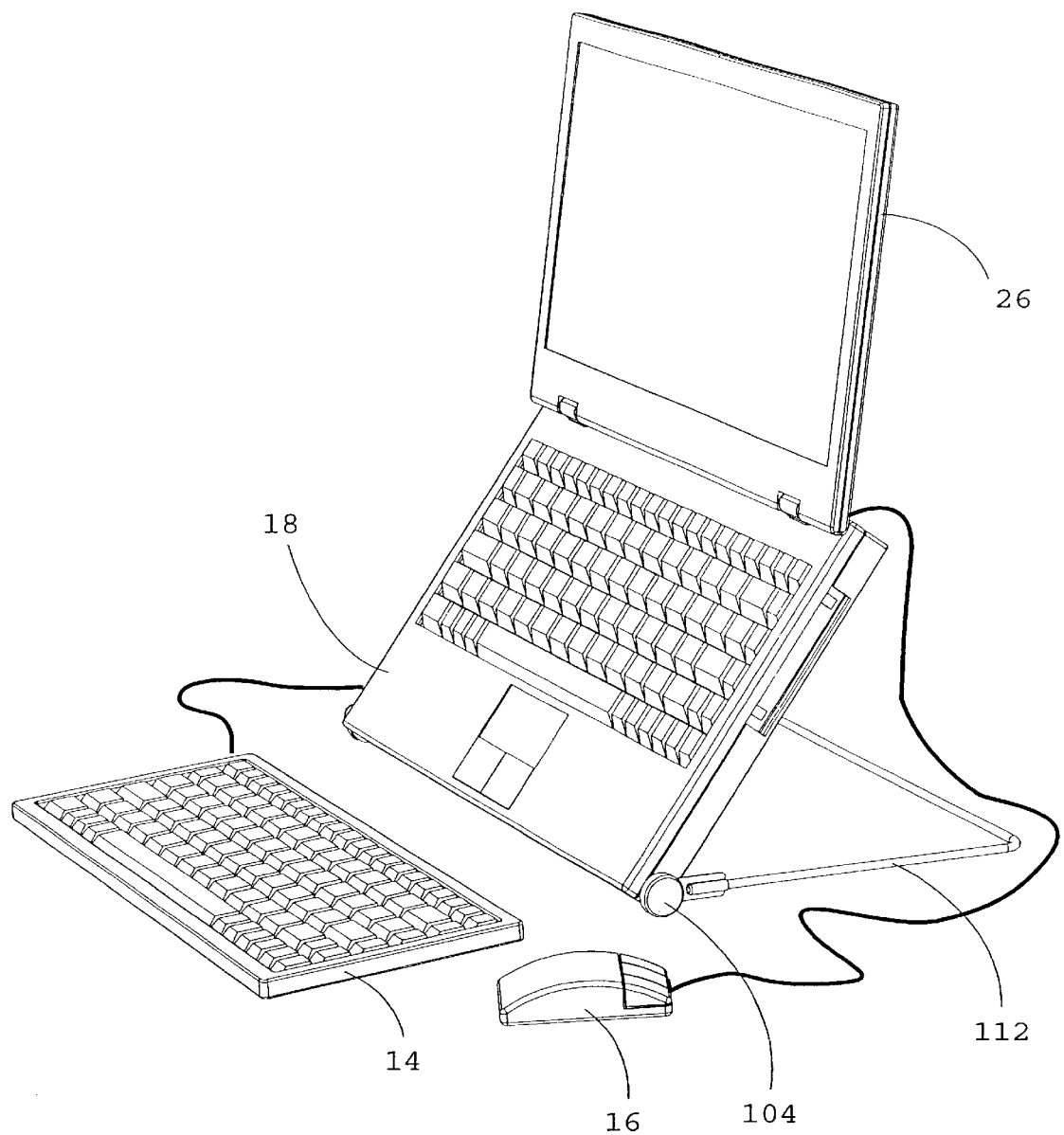
FIG. 22 is a front perspective view of the portable computer of the present invention with an integral support bar.
Figure 23:
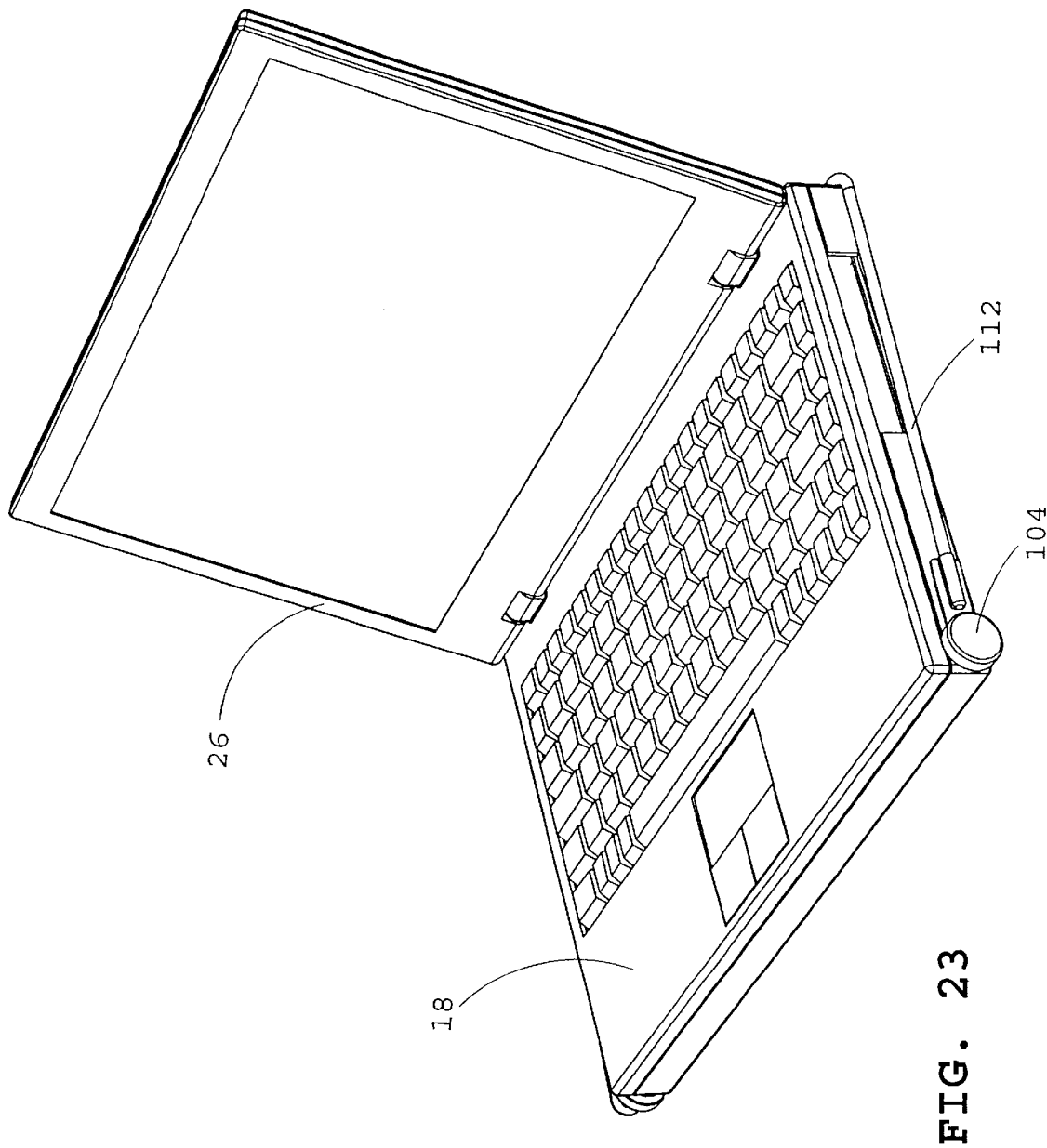
FIG. 23 is a front view of the portable computer of the present invention in the horizontal orientation with an integral support bar folded alongside the computer.
Figure 24:
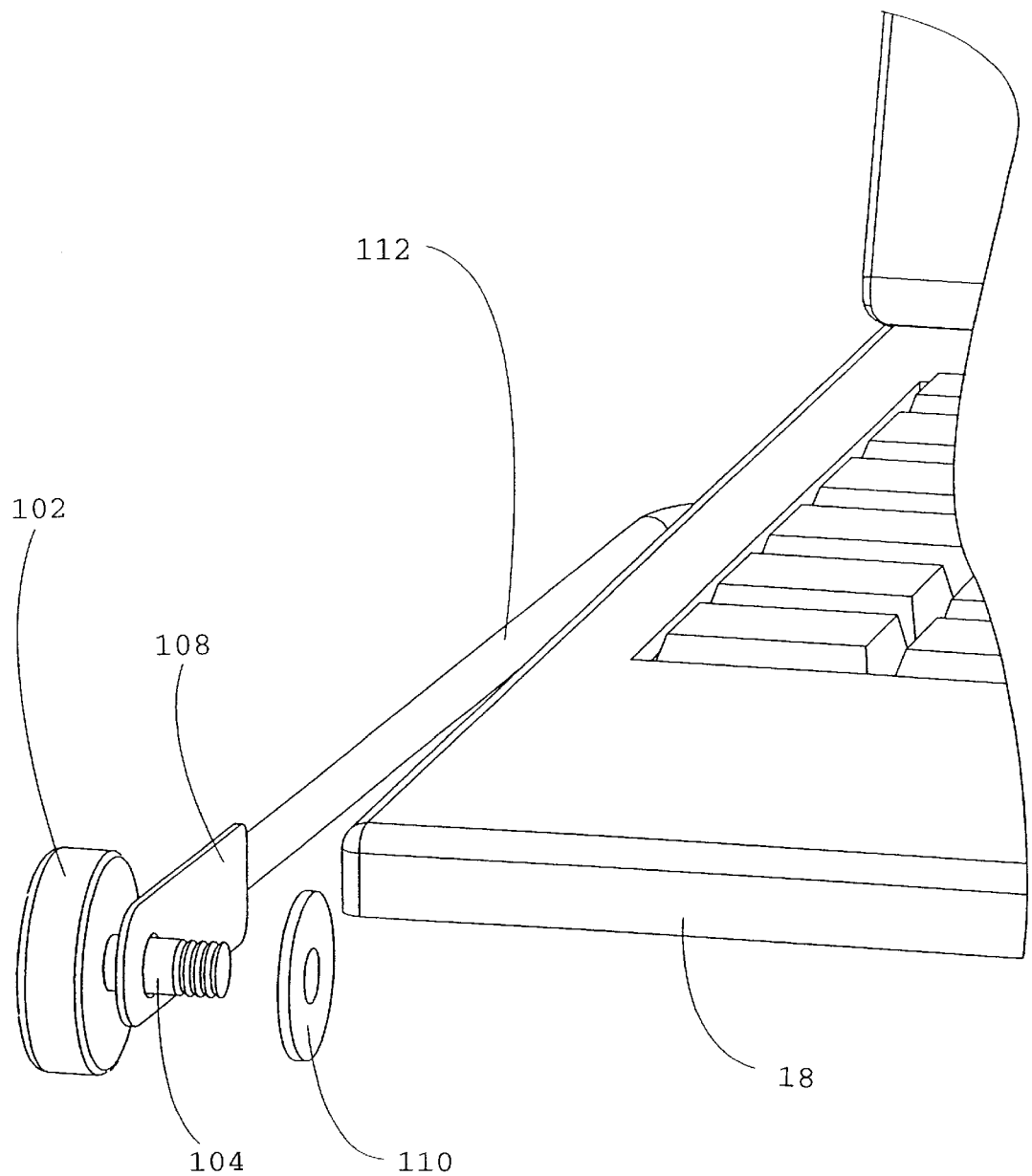
FIG. 24 is a partial front perspective view of the integral support bar on the portable computer.

FIGS. 22–24 show the base plate of FIGS. 20–21 replaced with an integral support bar 112 attached to or integrally formed with a pivot member 108 that engages with the angle adjustment knob 102 and friction disk pad 112. The integral support bar 112 is ideal because it does not add to the thickness dimension of portable computer 12.

Figure 25:
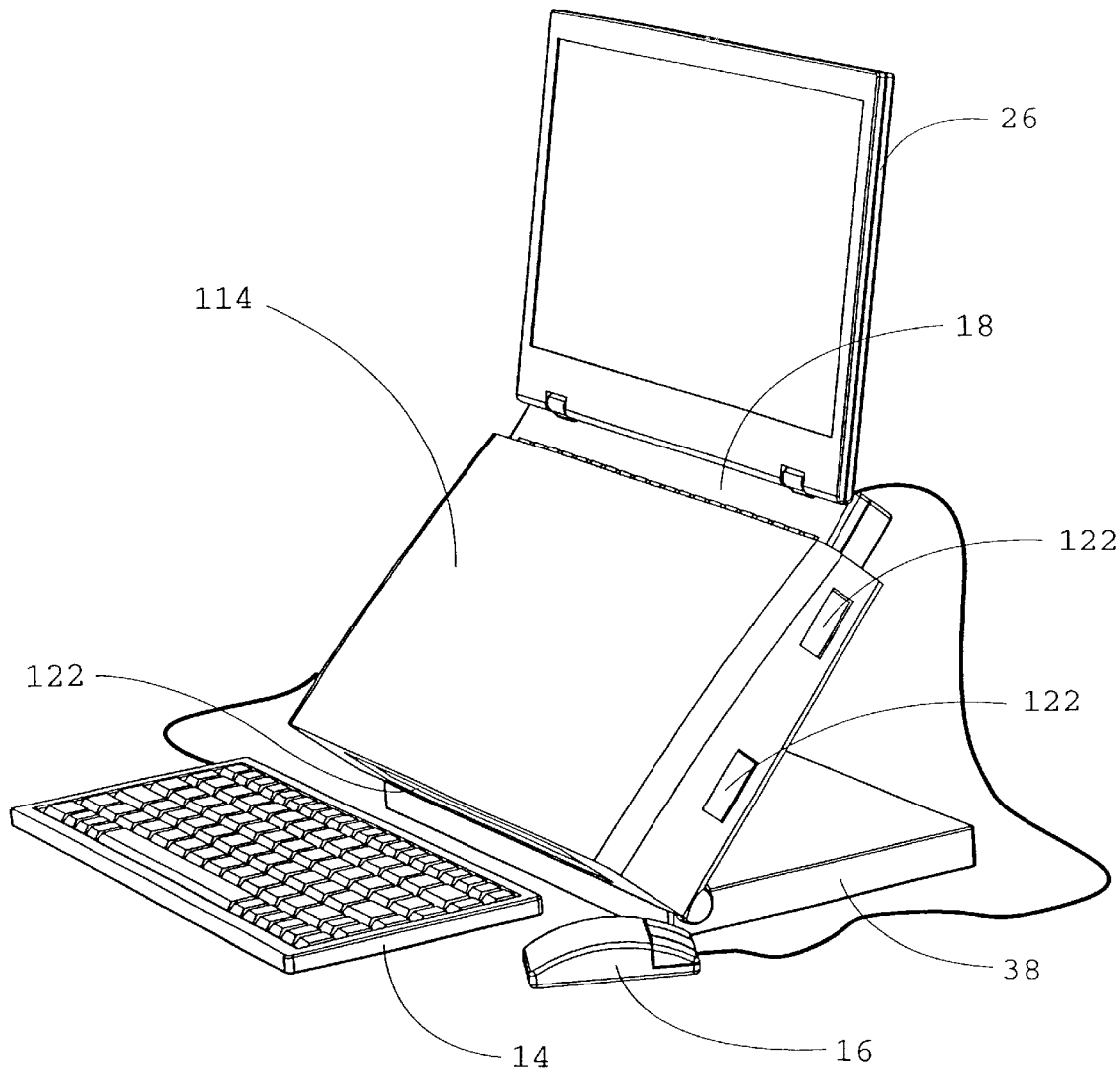
FIG. 25 is a front perspective view of a portable computer mounted in and covered by the enclosed dock housing of the present invention.
Figure 26:
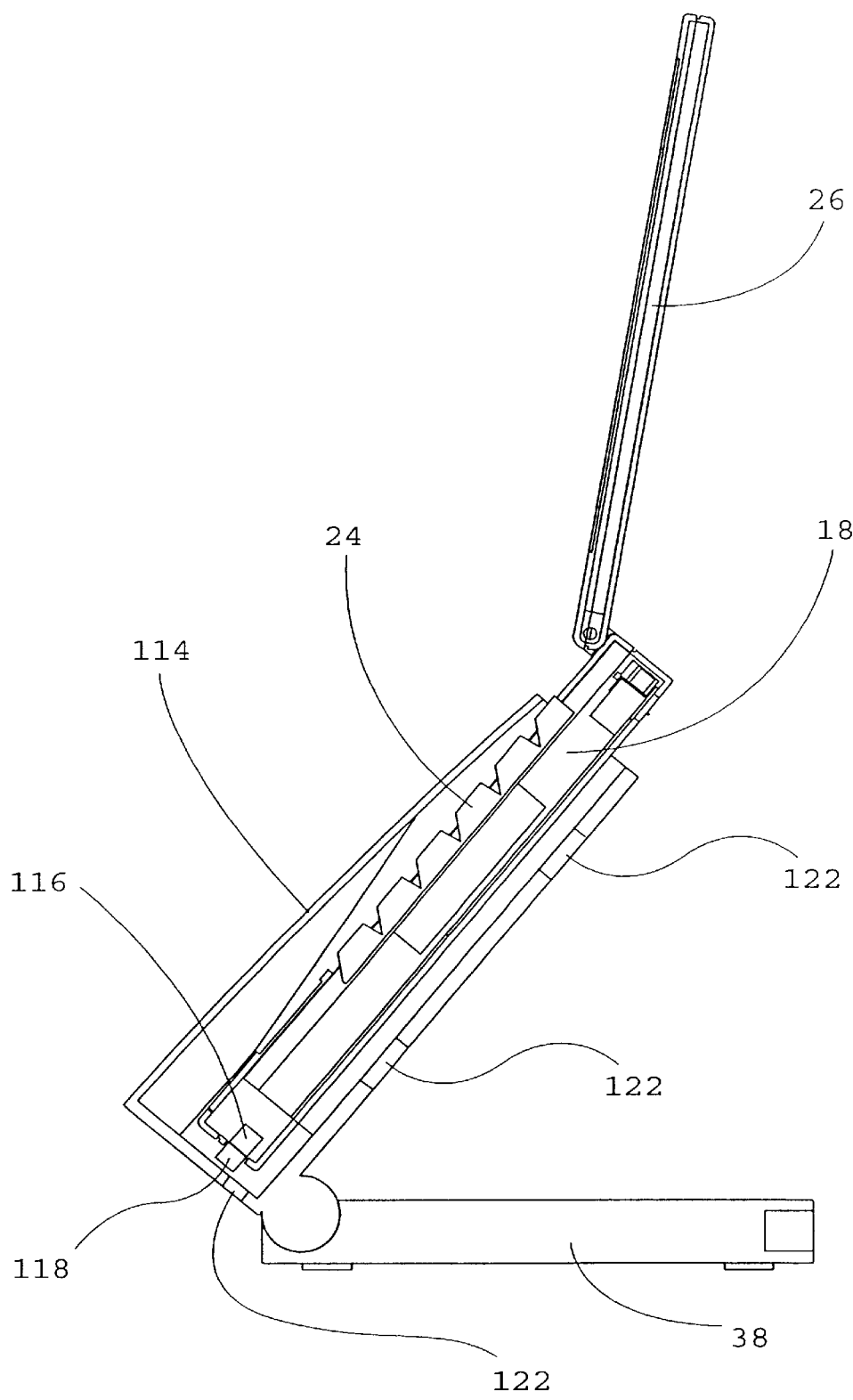
FIG. 26 is a side cross-section view of a portable computer mounted in and covered by enclosed dock housing of the present invention.

FIGS. 25–26 shows portable computer 12 positioned inside an enclosed dock housing 114, so that keyboard 24 is hidden from the user's view. In addition to providing an aesthetic covering for keyboard 24, the front surface of enclosed dock housing 114 provides a place for holding papers or post-it notes. FIG. 26 shows how portable computer 12 connects electrically to enclosed dock housing 114. A portable-side docking connector 116 is located on the front of portable computer base 18. A dock-side docking connector 118 (first electrical connector) is located at the corresponding spot at the bottom of enclosed dock housing 114. When portable computer 12 is inserted into enclosed dock housing 114, the connectors 116/118 are mated. Enclosed dock housing 114 could also exist without an electrical connection, so it would serve the purpose of a portable computer stand, but with the added function of a covering surface for keyboard 24. Cooling apertures 122 can be formed in the dock housing 114.

Figure 27:
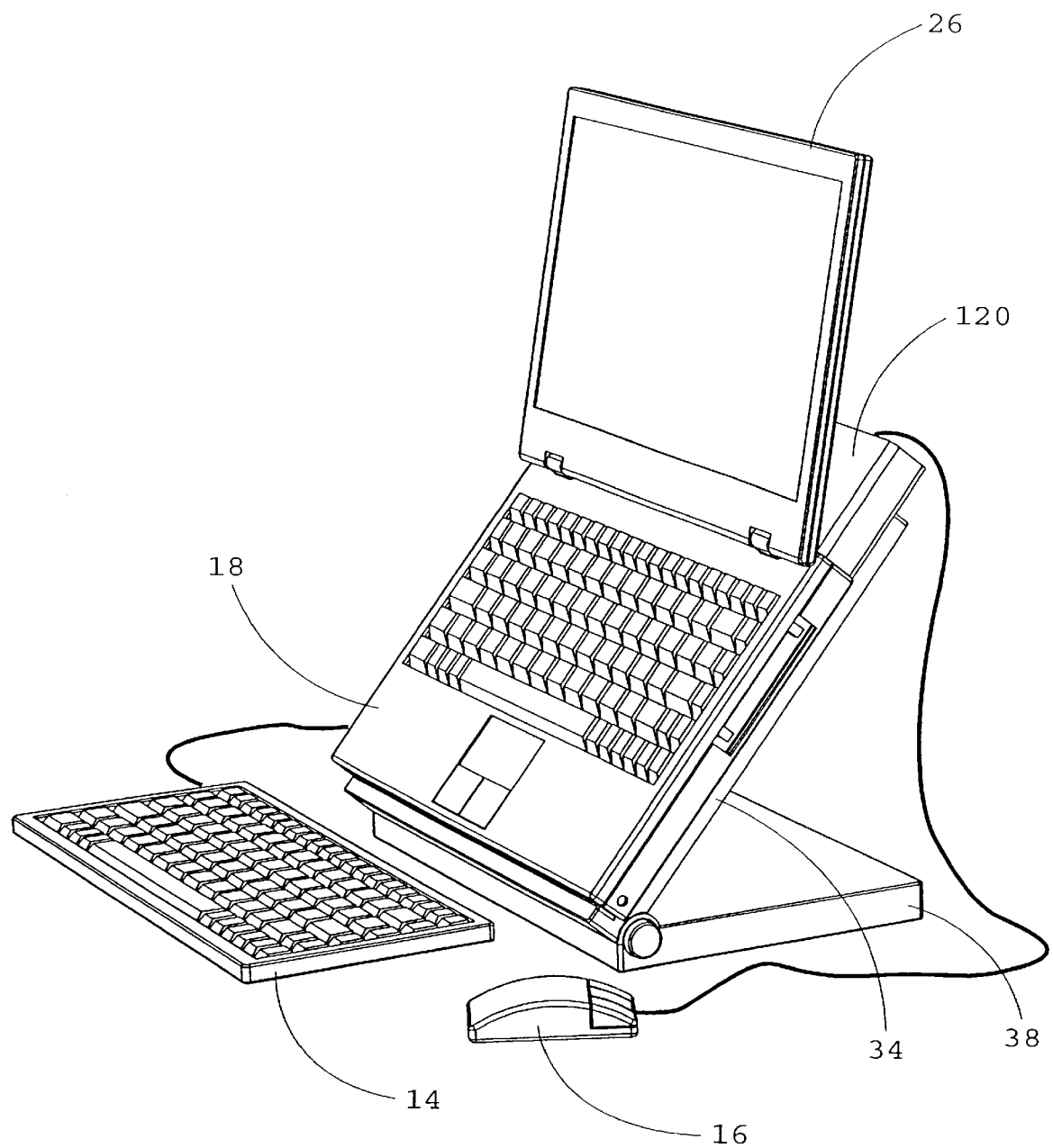
FIG. 27 is a front perspective view of a portable computer mounted on the portable computer docking/positioning device of the present invention, including an attached port replicator.
Figure 28:
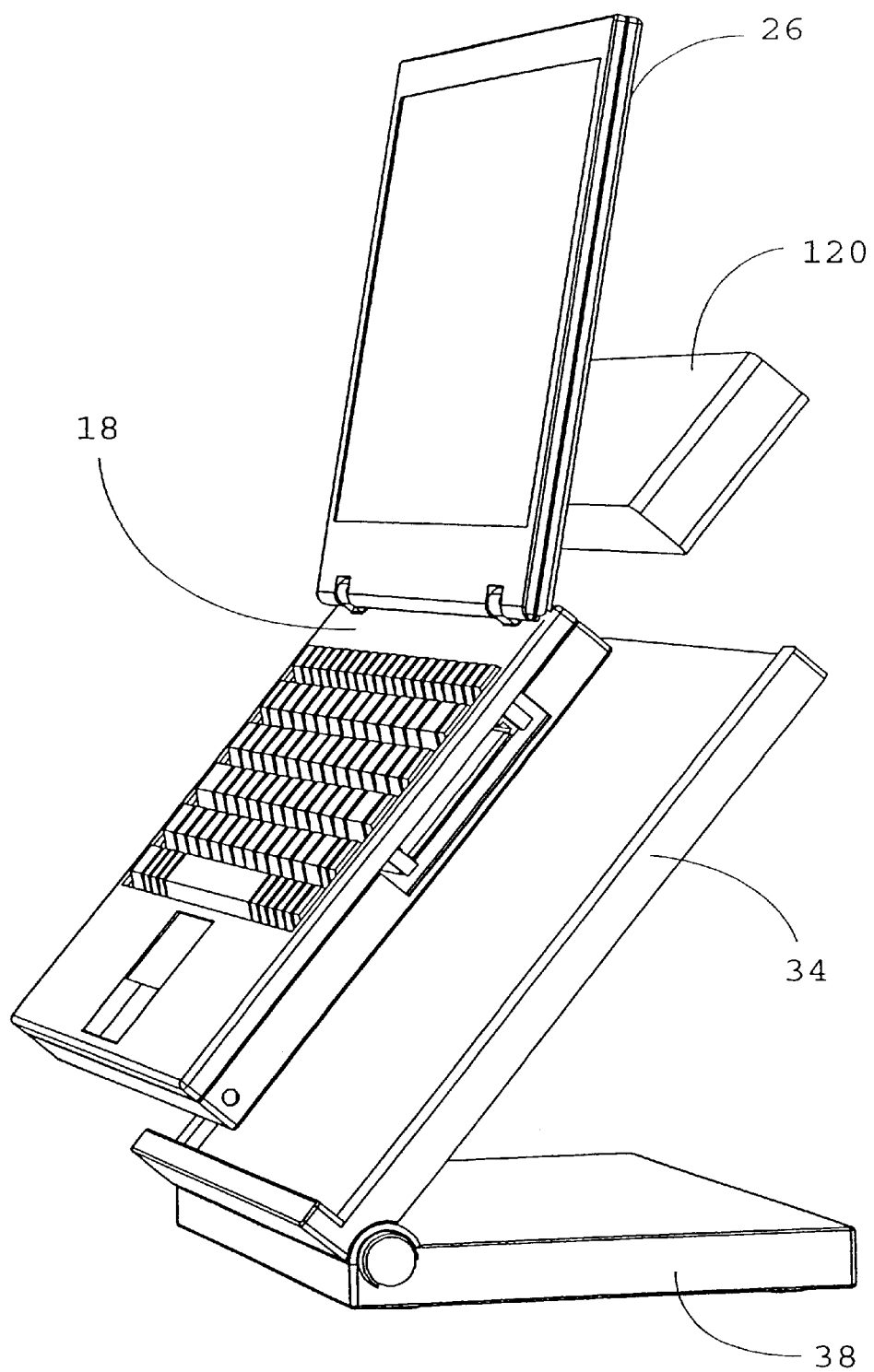
FIG. 28 is an exploded view showing a portable computer and the docking/positioning device of the present invention together with the port replicator.

In any of the above described docking/positioning devices that contain an electrical connector for the portable computer, the electrical connector can instead be a port replicator that engages the I/O ports 33 of the portable computer 12. For example, FIG. 27 shows the docking/positioning device of FIGS. 5–6, but instead with a port replicator 120. Port replicators are well known in the art of portable computer design, are available for most portable computers and serve the purpose of providing a single, fast connection at a location where the user wants to connect one or more peripheral devices or systems to the I/O ports 33 of the portable computer. Rather than connect and disconnect each peripheral connector when setting up portable computer, the user simply plugs portable computer into the front end of port replicator 120. All of the peripheral connections remain plugged into the rear surface of port replicator 120. For example, a port replicator might have the following I/O connectors semi-permanently attached: serial, parallel, SCSI, keyboard, mouse, ethernet, USB, and power. FIG. 27 shows explicitly connections to mouse 16 and external keyboard 14. FIG. 28 shows the component assemblies of this embodiment separately. The port replicator 120 can be separately attached, or it can be fixed to the docking plate 34 so that the portable computer I/O ports 33 connect to the replicator 120 as the portable computer 12 is placed onto docking plate 34.

Figure 29:
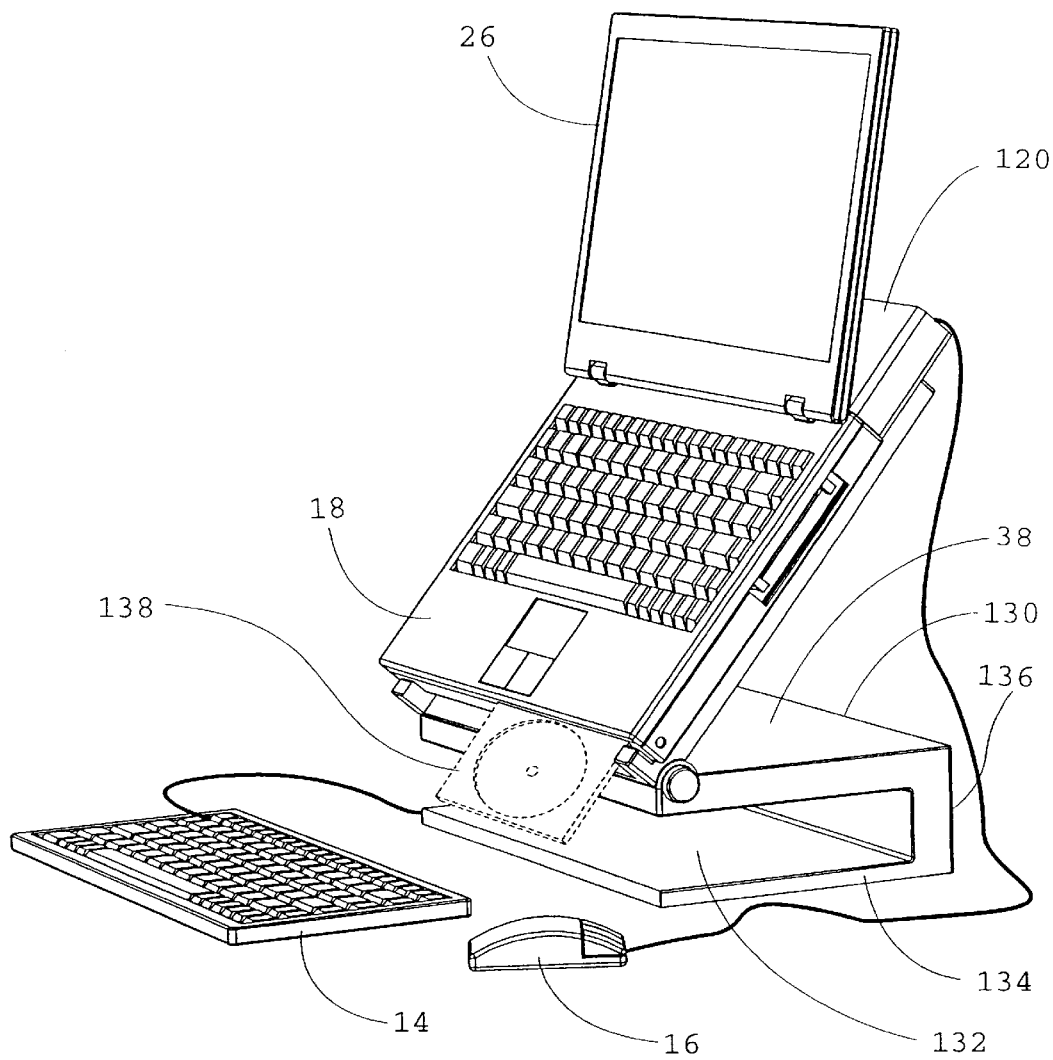
FIGS. 29 and 30 are front perspective views of a portable computer mounted on the portable computer docking/positioning device of the present invention, including a second dock base to form a storage area.
Figure 30:
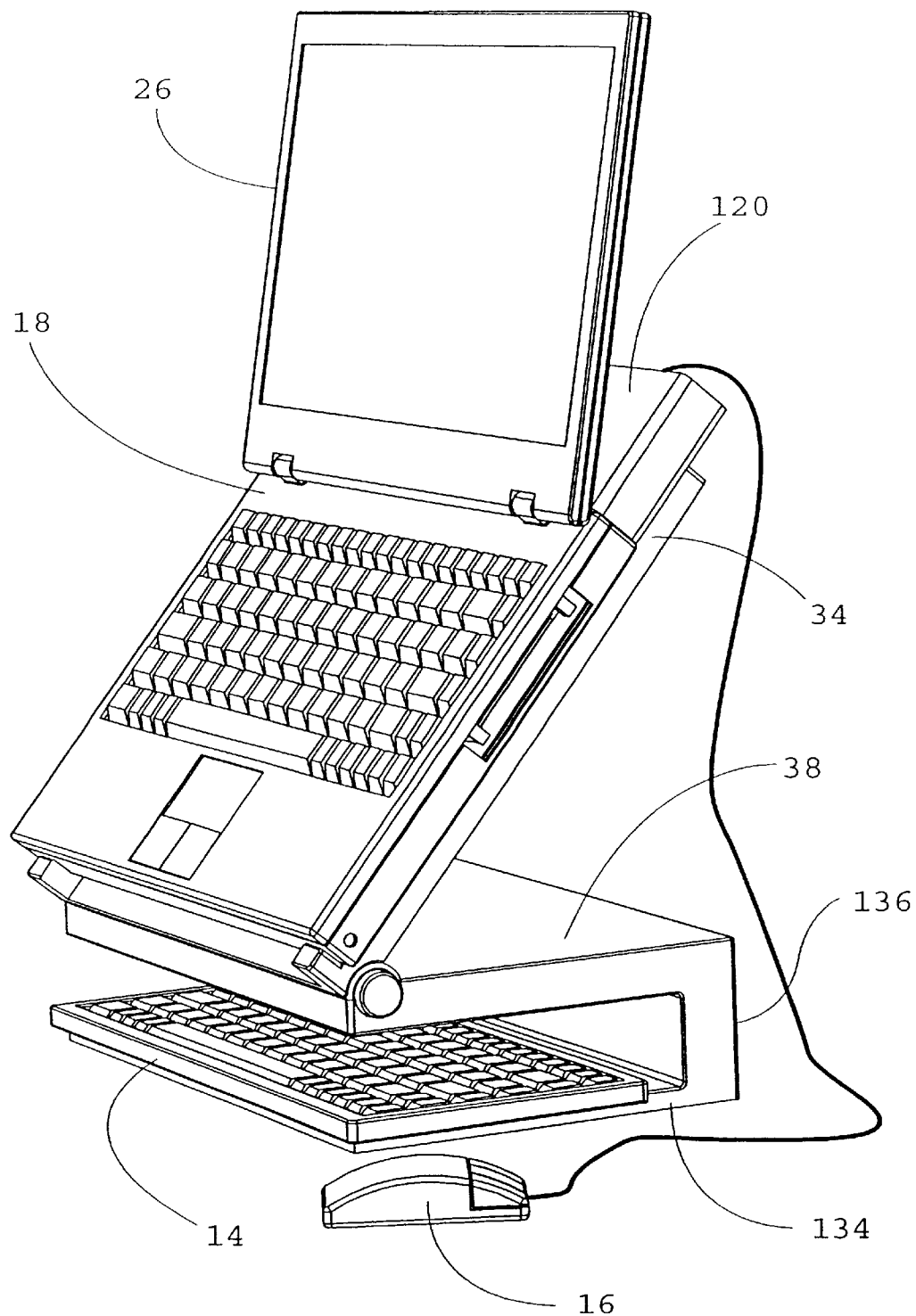

FIG. 29 shows the docking/positioning device with an external keyboard storage slot 132 underneath the dock base 38. A second dock base 134 together with an upwardly extending support member 136 support dock base 38, with the storage slot 132 formed therebetween. FIG. 30 shows how external keyboard 14 is located in storage slot 132 underneath dock base 38, when not in use, to conserve desktop surface area. When portable computer 12 is in use, external keyboard 14 is removed from storage slot 132 and placed closer to the user. This embodiment is ideal because it affords access to front loading media, such as a CD player 138, while the portable computer is supported in an inclined position.

Figure 31:
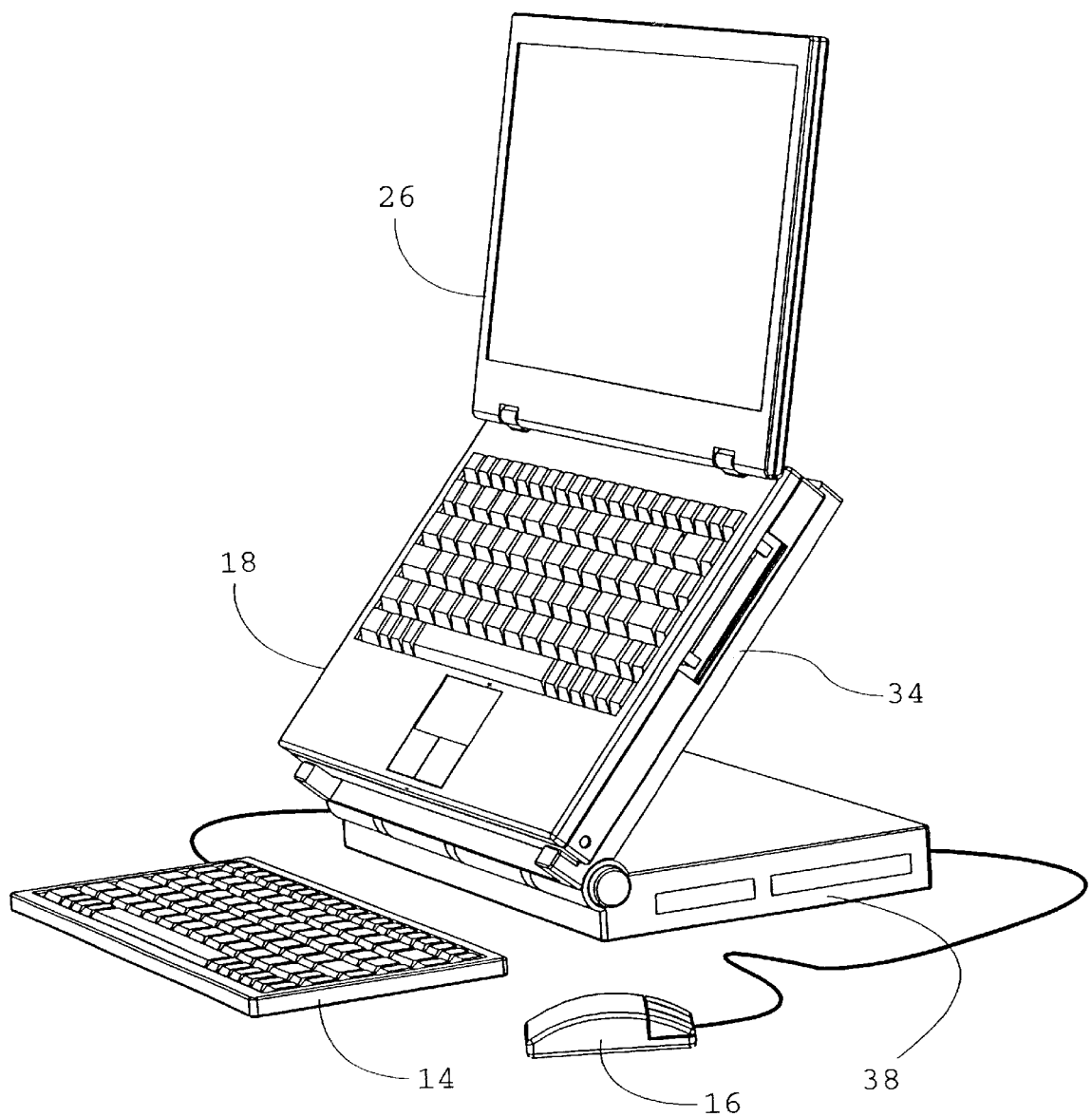
FIG. 31 is a front perspective view of a portable computer mounted on the portable computer docking/positioning device of the present invention, including a dock base enclosure containing a hard disk drive and expansion slots.

FIG. 31 shows an embodiment where dock base 38 forms an enclosure having a volume large enough to contain peripheral devices and/or expansion slots for adding peripheral cards or media bays. Dock base 38 may contain hard disk drives, CDROM, DVD, removable media drives, etc., to save space.

It is to be understood that the present invention is not limited to the embodiments described above and illustrated herein, but encompasses any and all variations falling within the scope of the appended claims. For example, the electrical connectors on the docking/positioning device can be designed and located to engage with any electrical connector on any type of computer. In addition, the dock base 38 could be replaced with the support plate 82 or support bar 112. Moreover, the nut 55 can be omitted and one of the pivot disks 46 or base hinge protrusions 47 can include threads for engaging the threaded end of axle 52.

What is claimed is:

1. A positioning device for supporting a portable computer, comprising:
   a base member for placing on a horizontal surface;
   a support plate for supporting the portable computer at an inclined position relative to the base member;
   a hinge that rotatably connects the base member to the support plate so that the support plate can be rotated between multiple angular positions relative to the base member;
   a lock mechanism for selectively fixing the angular position between the base member and the support plate; and
   a cooling channel formed in the support plate, wherein when the support plate is fixed at an inclined position and the portable computer is placed on the support plate, air flows between the support plate and the portable computer through the cooling channel.

2. The positioning device of claim 1, wherein the support plate further includes a fan that circulates air through the cooling channel.

3. The positioning device of claim 1, wherein:
the hinge system includes:
base hinge protrusions formed in the base member and having an axle hole therethrough;
support hinge protrusions formed in the support plate and having an axle hole therethrough; and
an axle extending through the axle holes in the base member and support plate, the axle having a threaded end that engages threads formed in one of the base hinge and support hinge protrusions;
wherein the lock mechanism includes:
an adjustment knob attached to the axle for rotating the axle to selectively increase a compressive force between the base hinge protrusions and the support hinge protrusions.

4. A positioning device for supporting a portable computer, comprising:
a base member for placing on a horizontal surface;
a support plate for supporting the portable computer at an inclined position relative to the base member;
a hinge that rotatably connects the base member to the support plate so that the support plate can be rotated between multiple angular positions relative to the base member;
a lock mechanism for selectively fixing the angular position between the base member and the support plate; and
a hollow housing attached to the support plate to form an enclosure that defines an open ended storage slot for receiving the portable computer.

5. The positioning device of claim 4, wherein at least one cooling aperture is formed in the hollow housing.

6. The positioning device of claim 4, further comprising:
a first electrical connector attached to the enclosure to engage with an input/output connector of the portable computer when the portable computer is placed in the enclosure; and
a second electrical connector attached to the base member;
wherein the first and second connectors are electrically connected to each other.

7. A positioning device for supporting a portable computer, comprising:
a base member for placing on a horizontal surface;
a support plate for supporting the portable computer at an inclined position relative to the base member;
a hinge that rotatably connects the base member to the support plate so that the support plate can be rotated between multiple angular positions relative to the base member;
a lock mechanism for selectively fixing the angular position between the base member and the support plate;
a second base member; and
a support member attached between the first and second base members, the support member supporting the first base member above the second base member to form an open space therebetween.

8. A portable computer, comprising:
a base housing having a front and rear end;
a flat panel display rotatably attached to the rear end of the base housing;
a keyboard attached to a top surface of the base housing;
a support member rotatably attached to the front end of the base housing so that the support member can be rotated between multiple angular positions relative to the base housing; and
a lock mechanism for selectively fixing the angular position between the support member and the base housing so that the support member supports the base housing at an inclined position.

9. The portable computer of claim 8, wherein the support member is a flat plate.

10. The portable computer of claim 8, wherein the support member is a U-shaped bar.

11. The portable computer of claim 8, wherein:
the base housing includes a first keyboard electrical connector;
the keyboard is removably attached to the top surface of the base housing, the keyboard including a second keyboard electrical connector that mates with the first keyboard electrical connector when the keyboard is mounted to the base housing.

12. The portable computer of claim 11, further comprising:
a keyboard case with a third keyboard electrical connector; and
a cable for transferring signals from the third keyboard electrical connector to the portable computer;
wherein when the keyboard is placed onto the keyboard case, the second and third keyboard connectors mate together.

* * * * *